US010676291B2

(12) United States Patent
Hui et al.

(10) Patent No.: US 10,676,291 B2
(45) Date of Patent: Jun. 9, 2020

(54) AIR DISTRIBUTION SYSTEM FOR A PNEUMATIC CONVEYING SYSTEM

(71) Applicant: CNH Industrial Canada, Ltd., Saskatoon (CA)

(72) Inventors: Ka Po Catherine Hui, Saskatoon (CA); Martin J. Roberge, Saskatoon (CA); Joël Jean-Claude Denis, Saskatoon (CA); Owen Robert Carlton, Saskatoon (CA); Dennis George Thompson, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 15/872,089

(22) Filed: Jan. 16, 2018

(65) Prior Publication Data

US 2018/0134504 A1 May 17, 2018

Related U.S. Application Data

(63) Continuation of application No. 15/055,794, filed on Feb. 29, 2016, now Pat. No. 9,902,571.

(51) Int. Cl.
*B65G 53/52* (2006.01)
*B65G 53/34* (2006.01)
*A01C 7/08* (2006.01)

(52) U.S. Cl.
CPC .............. *B65G 53/34* (2013.01); *A01C 7/081* (2013.01)

(58) Field of Classification Search
CPC ....... B65G 53/528; A01C 7/084; F16L 41/023
USPC ....... 406/181, 182, 183; 137/561 A; 111/175
See application file for complete search history.

(56) References Cited

U.S. PATENT DOCUMENTS

| 1,850,937 A | 3/1932 | Messinger |
| 1,871,853 A | 4/1932 | Kennedy |
| 2,171,205 A | 8/1939 | Zinke |
| 2,657,702 A | 11/1953 | Weisenbach |
| 2,736,489 A | 2/1956 | Bopf |
| 3,265,442 A | 8/1966 | Willis, Jr. et al. |
| 3,267,891 A | 8/1966 | Hemker |
| 3,864,938 A | 2/1975 | Hayes, Jr. |
| 3,944,261 A | 3/1976 | Reed et al. |

(Continued)

OTHER PUBLICATIONS

John Deere—Parts Catalog, Stationary Double Shoot Manifold Tube Assembly, 2 pgs, printed Apr. 17, 2012.

(Continued)

*Primary Examiner* — Joseph A Dillon, Jr.
(74) *Attorney, Agent, or Firm* — Rebecca L. Henkel; Rickard K. DeMille

(57) ABSTRACT

A plenum of distributing a flow of air from an air source includes ports extending from a face element of a body. The ports are configured to direct the flow of air out of the plenum, and the ports are arranged on the face element in a first row having first length, a second row having a second length, and a third row having a third length. The first row is positioned proximate to the top element, the third row is positioned proximate to the bottom element, and the second row is positioned between the first row and the third row. In addition, the second length is greater than the first length and the third length, and a shape of the face element is configured to accommodate the first length of the first row, the second length of the second row, and the third length of the third row.

14 Claims, 16 Drawing Sheets

(56) References Cited

U.S. PATENT DOCUMENTS

| | | | |
|---|---|---|---|
| 4,140,178 A | | 2/1979 | Ohiswager et al. |
| 4,481,975 A | | 11/1984 | Buckley |
| 4,528,919 A | | 7/1985 | Harbolt et al. |
| 4,549,567 A | | 10/1985 | Horton |
| 4,717,289 A | | 1/1988 | Popowich et al. |
| 5,101,847 A | * | 4/1992 | Oribe .................. F24F 7/06 137/1 |
| 5,156,642 A | | 10/1992 | Lopez |
| 5,226,213 A | * | 7/1993 | Lewis .................. D01G 23/08 137/832 |
| 5,241,867 A | * | 9/1993 | Cohen .................. G01N 1/18 137/561 A |
| 5,934,205 A | | 8/1999 | Gordon et al. |
| 5,979,343 A | | 11/1999 | Gregor et al. |
| 5,996,516 A | * | 12/1999 | Benneweis ............ A01C 7/081 111/176 |
| 6,192,813 B1 | * | 2/2001 | Memory ................ A01C 7/081 111/176 |
| 6,210,109 B1 | | 4/2001 | Will et al. |
| 6,213,690 B1 | | 4/2001 | Gregor et al. |
| 6,220,793 B1 | | 4/2001 | Meyer |
| 6,289,679 B1 | | 9/2001 | Tunkel et al. |
| 6,516,810 B1 | * | 2/2003 | Haul .................... A24C 5/323 131/108 |
| 6,672,627 B1 | | 1/2004 | Mariman et al. |
| 6,811,358 B2 | * | 11/2004 | Bauver ................ B65G 53/528 406/113 |
| 7,014,392 B2 | | 3/2006 | Duwe et al. |
| 7,162,962 B2 | * | 1/2007 | Fuessel ................ A01C 7/081 111/176 |
| 7,290,566 B1 | * | 11/2007 | Young .................. F16K 11/052 137/875 |
| 7,785,043 B2 | | 8/2010 | Elsen |
| 8,001,994 B2 | * | 8/2011 | Miller .................. B08B 5/02 137/874 |
| 8,151,885 B2 | | 4/2012 | Bull et al. |
| 8,403,602 B2 | | 3/2013 | Zarnescu |
| 8,931,509 B2 | | 1/2015 | Beard |
| D755,728 S | | 5/2016 | Smith |
| D782,543 S | | 3/2017 | Hui et al. |
| D783,058 S | | 4/2017 | Hui et al. |
| D784,421 S | | 4/2017 | Hui et al. |
| 9,629,303 B2 | | 4/2017 | Roberge et al. |
| 9,681,600 B2 | | 6/2017 | Henry et al. |
| 9,969,569 B2 | | 5/2018 | Borkgren |
| 10,143,129 B2 | | 12/2018 | Roberge et al. |
| 10,178,180 B2 | | 1/2019 | Roberge et al. |
| 10,306,825 B2 | | 6/2019 | Hui et al. |
| 2003/0161694 A1 | | 8/2003 | Bauver et al. |
| 2008/0276998 A1 | | 11/2008 | Boyher et al. |
| 2009/0242047 A1 | * | 10/2009 | Hilton .................. F16L 41/03 137/561 A |
| 2010/0065140 A1 | | 3/2010 | Joynson et al. |
| 2011/0253233 A1 | | 10/2011 | Hillier et al. |
| 2011/0311322 A1 | * | 12/2011 | Jost .................... A01C 7/082 406/181 |
| 2011/0315256 A1 | * | 12/2011 | Petersen ................ A01C 7/084 137/583 |
| 2012/0186501 A1 | | 7/2012 | Zarnescu et al. |
| 2012/0237304 A1 | | 9/2012 | Zarnescu |
| 2012/0301231 A1 | | 11/2012 | Jagow et al. |
| 2013/0211628 A1 | | 8/2013 | Thurow et al. |
| 2014/0056701 A1 | * | 2/2014 | Caplan .................. F04D 29/522 415/182.1 |
| 2015/0246773 A1 | * | 9/2015 | Sundholm ............ B65F 1/0093 406/1 |
| 2015/0298919 A1 | | 10/2015 | Le |
| 2016/0120098 A1 | | 5/2016 | Hui et al. |
| 2017/0089000 A1 | * | 3/2017 | Sang .................... D06F 39/083 |
| 2017/0172060 A1 | | 6/2017 | Roberge et al. |
| 2018/0134505 A1 | | 5/2018 | Hui et al. |
| 2019/0239424 A1 | | 8/2019 | Hui et al. |
| 2019/0281757 A1 | | 9/2019 | Hui et al. |

OTHER PUBLICATIONS

John Deere Seeding Group, AirPower 2, Jan. 8, 2016.
John Deere—Parts Catalog, Dual Fan Plenum and Manifold to Plunum Flex Lines (430 TBT) (430/550 TBH), 3 pgs, Jan. 11, 2016.
U.S. Appl. No. 15/872,289, filed Jan. 16, 2018, Hui et al.
U.S. Appl. No. 15/872,063, filed Jan. 16, 2018, Hui et al.
U.S. Appl. No. 16,690,941, filed Nov. 21, 2019, Hui et al.
U.S. Appl. No. 62/206,225, filed Aug. 17, 2015, Hui et al.

* cited by examiner

FIG. 15

AIR DISTRIBUTION SYSTEM FOR A PNEUMATIC CONVEYING SYSTEM

CROSS-REFERENCE TO RELATED APPLICATION

This application is a continuation of U.S. patent application Ser. No. 15/055,794, entitled "AIR DISTRIBUTION SYSTEM FOR A PNEUMATIC CONVEYING SYSTEM," filed Feb. 29, 2016, which is hereby incorporated by reference in its entirety.

BACKGROUND

The present disclosure relates generally to an air distribution system for a pneumatic conveying system.

Generally, agricultural implements are towed behind an off-road work vehicle, such as a tractor. These agricultural implements typically include multiple rows of ground engaging opener assemblies configured to excavate trenches into soil and to deposit a granular product, such as seeds or fertilizer, into the trenches. The granular product may be stored in a central location, such as in storage tank(s) of an air cart, and distributed to each of the ground engaging opener assemblies for deposition into the soil. However, the flow of granular product from the air cart may be uneven, thereby resulting in uneven distribution of the granular product to the ground engaging opener assemblies and/or potential plugging of distribution hoses.

BRIEF DESCRIPTION

In one embodiment, a plenum of distributing a flow of air from an air source includes a body having an inlet positioned at a first end of the body and configured receive the flow of air from the air source. The body also includes a first side coupled to a top element and to a bottom element, in which the top element is opposite the bottom element. In addition, the body includes a second side, opposite the first side, coupled to the top element and the bottom element, and a face element disposed on a second end of the body, opposite the first end. The plenum also includes multiple ports extending from the face element and configured to direct the flow of air out of the plenum. The ports are arranged on the face element in a first row having first length, a second row having a second length, and a third row having a third length, the first row is positioned proximate to the top element, the third row is positioned proximate to the bottom element, and the second row is positioned between the first row and the third row. In addition, the second length is greater than the first length and the third length, and a shape of the face element is configured to accommodate the first length of the first row, the second length of the second row, and the third length of the third row.

In another embodiment, a plenum for distributing a flow of air from an air source includes a body having an inlet positioned at a first end of the body and configured to receive the flow of air from the air source. The plenum also includes a face element positioned on a second end of the body, opposite the first end, and at least one outlet port extending from the face element and configured to direct the flow of air out of the plenum. In addition, the plenum includes a baffle assembly disposed within the body and configured to control the flow of air through the plenum. The baffle assembly includes at least one baffle and an adjustment assembly, and the adjustment assembly is configured to control an angle of the at least one baffle, a lateral position of the at least one baffle, or a combination thereof.

In another embodiment, a plenum for distributing a flow of air from an air source includes a body having an inlet positioned at a first end of the body and configured receive the flow of air from the air source, and a face element positioned on a second end of the body, opposite the first end. The plenum also includes multiple ports extending from the face element and configured to direct the flow of air out of the plenum. In addition, the plenum includes a flow restrictor configured to be disposed within one port. The flow restrictor includes a lip configured to engage a distal end of the one port to block movement of the flow restrictor into the body while the flow restrictor is disposed within the one port, and the flow restrictor includes an internal passage having a minimum cross-sectional area less than a minimum internal cross-sectional area of the one port.

DRAWINGS

These and other features, aspects, and advantages of the present invention will become better understood when the following detailed description is read with reference to the accompanying drawings in which like characters represent like parts throughout the drawings, wherein:

FIG. 15 is a perspective view of a portion of the plenum of FIG. 11, including flow restrictors.

DETAILED DESCRIPTION

Figure 1:
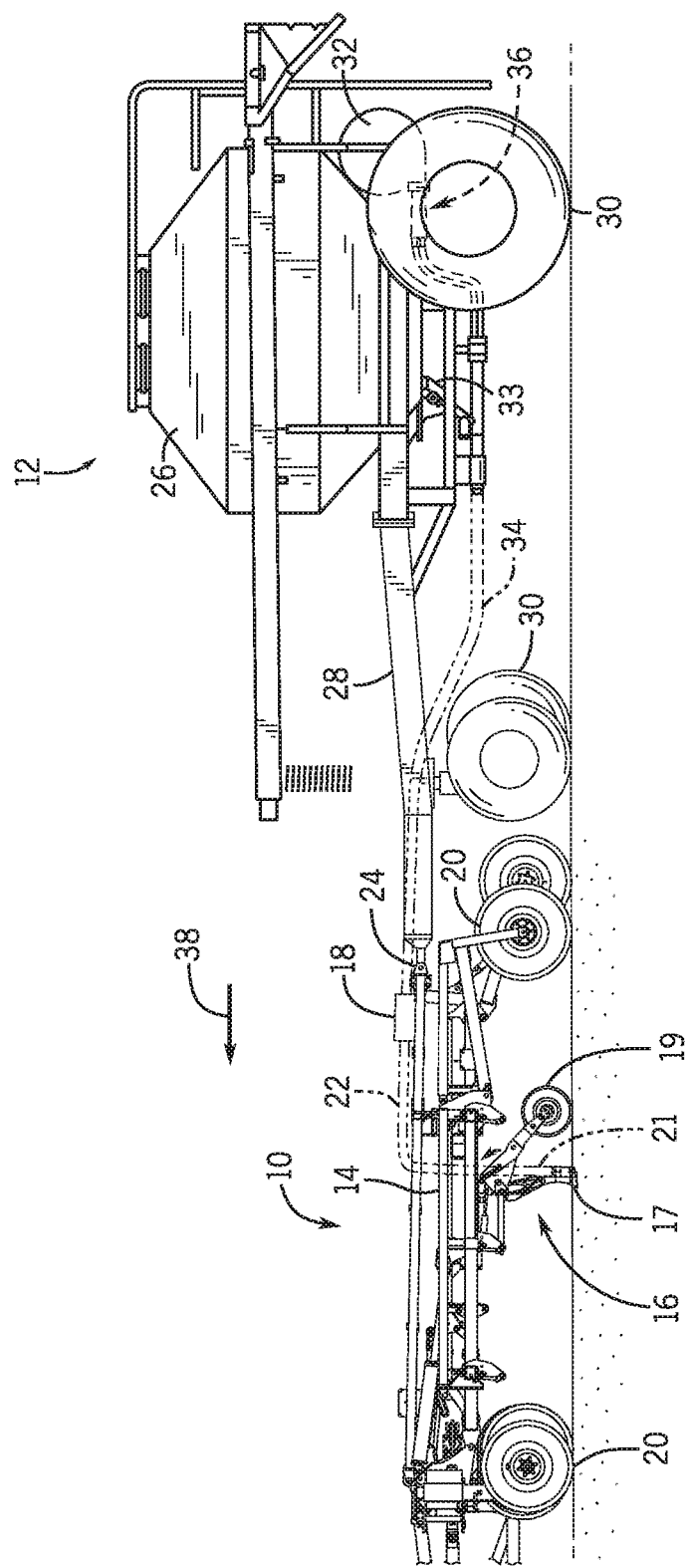
FIG. 1 is a side view of an agricultural implement and an air cart, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking (e.g., of designing, fabricating, and/or manufacturing) for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain agricultural implements may distribute a granular product (e.g., seeds or fertilizer) from a centralized location to multiple row units, such as ground engaging opener assemblies. Additionally, each of the ground engaging opener assemblies may engage soil to excavate a trench into the soil and to deposit the received granular product into the soil. The granular product may be any suitable particulate material that is desired to be deposited into the soil, such as various types of seeds and fertilizers. However, to simplify the following discussion, the product will be described as seeds. Nevertheless, one of ordinary skill in the art would recognize that the techniques described herein may be easily adapted for use with other products.

In certain embodiments, each of the ground engaging opener assemblies may not include adjustable control over the deposition of seeds. Instead, each ground engaging opener assembly may pneumatically receive seeds via a pneumatic hose (e.g., extending from a header of the implement). The ground engaging opener assembly may then utilize gravity to drop received seeds into a trench. In other words, the ground engaging opener assembly may deposit seeds based on fixed parameters, such as the size of the hose and/or the flow rate of seeds to the ground engaging opener assembly, among other factors. However, in certain embodiments, the ground engaging opener assemblies may include adjustable control(s) over the deposition of seeds (e.g., via a seed meter).

Generally, the seeds may be stored in a centralized location, such as in storage tanks of an air cart, before being distributed to each of the ground engaging opener assemblies (e.g., via pneumatic hoses, headers, etc.). In certain embodiments, the centralized location is pressurized (e.g., via a pneumatic hose). In certain embodiments, seed distribution from the centralized location to the ground engaging opener assemblies is controlled (e.g., metered). However, when multiple ground engaging opener assemblies are utilized, seeds may not be equally distributed to each of the ground engaging opener assemblies. In addition, the pneumatic hoses which convey the seeds to the ground engaging opener assemblies may become clogged.

Additionally, it may be desirable to deposit seeds using only a portion of the ground engaging opener assemblies. For example, during planting/seeding operations, a portion of the agricultural implement may be positioned over a portion of the soil that was previously seeded or over a portion of the soil that is undesirable to seed (e.g., a headland, etc.). In such instances, it may be desirable to control seed flow to various portions of the agricultural implement (e.g., by enabling a portion of the seed meters that provide seeds to certain ground engaging opener assemblies while disabling another portion of seed meters that provide seeds to other ground engaging opener assemblies). However, when seed flow to certain ground engaging assemblies is disabled, air flow through the pneumatic hoses that supply the disabled ground engaging assemblies may increase due to the reduced resistance associated with termination of the seed flow through the hoses, a condition which may be known as "preferential flow". The increased air flow through the hoses may reduce the air flow into the tank, thereby reducing the pressure within the tank. As a result, the accuracy of seed metering into the pneumatic hoses may be reduced.

Accordingly, as will be described in more detail below, a system for supplying air to an agricultural implement and a seed tank is disclosed. For example, a plenum is coupled to an air source and configured to direct the air from the air source toward the ground engaging opener assemblies of the agricultural implement. The plenum includes outlet ports configured to couple to hoses that distribute the air to the ground engaging opener assemblies (e.g., via headers, secondary hoses, etc.). Additionally, the plenum includes a pressurization port configured to supply pressurized air to the tank, or in certain embodiments, to multiple tanks. While ground engaging opener assemblies are disclosed herein, it should be appreciated that the seeds and/or other agricultural products may be distributed via the flow of air through the hoses to other types of row units (e.g., nozzles, outlet passages, etc.).

To help illustrate, a side view of an agricultural implement 10 coupled to an air cart 12 is shown in FIG. 1. As depicted, the agricultural implement 10 includes a tool frame 14 coupled to a ground engaging opener assembly 16, a header 18, and wheel assemblies 20. The agricultural implement 10 may be pulled by an off-road work vehicle (e.g., a tractor), thereby enabling the agricultural implement 10 to deposit rows of product (e.g., seed). Accordingly, the wheel assemblies 20 may contact the soil surface to enable the agricultural implement 10 to be pulled by the off-road work vehicle. As the agricultural implement 10 is pulled, a row of product may be deposited into the soil by the ground engaging opener assembly 16. Although only one ground engaging opener assembly 16 is shown, the agricultural implement 10 may include multiple ground engaging opener assemblies 16 organized in a row across the agricultural implement 10. In some embodiments, the agricultural implement 10 may include a row of 12, 14, 16, 18, 20, or more ground engaging opener assemblies 16, which may each deposit a row of seeds.

To facilitate depositing seeds, each ground engaging opener assembly 16 includes an opener 17, a press wheel 19, and a seed tube 21. During operation, the opener 17 engages the soil, thereby excavating a trench into the soil as the ground engaging opener assembly 16 travels through the field. Seeds may then be deposited into the excavated trench via the seed tube 21. Then, the press wheel 19 may pack soil onto the seeds. The deposition of seeds by the ground engaging opener assembly 16 may be controlled by the distribution of seeds from the header 18. In some embodiments, the header 18 may pneumatically distribute the seeds from a primary hose to a second hose 22 (e.g., one secondary hose may connect the header 18 to each respective ground engaging opener assembly 16). For example, a primary hose 34 may direct seeds from the air cart 12 to the header 18. Additionally, the header 18 may distribute the seeds to the ground engaging opener assembly 16 via the secondary hose 22. In certain embodiments, multiple hoses 34 may direct seeds to multiple headers 18 of the agricultural implement 10. Moreover, multiple hoses 22 may be coupled to multiple respective opener assemblies 16. While the illustrated ground engaging opener assembly 16 includes a press wheel 19, it should be appreciated that in alternative embodiments, the press wheel may be omitted.

In the depicted embodiment, the air cart 12 is towed behind the agricultural implement 10. For example, the agricultural implement 10 may be coupled to the off-road work vehicle by a first hitch assembly, and the air cart 12 may be coupled to the agricultural implement 10 by a second hitch assembly 24. However, in other embodiments, the agricultural implement may be towed behind the air cart. In further embodiments, the implement and the air cart may be part of a single unit that is towed behind an off-road work vehicle, or the implement and the air cart may be elements of a self-propelled vehicle.

As described above, the air cart 12 may centrally store seeds and distribute the seeds to the headers 18. Accordingly, as depicted, the air cart 12 includes a storage tank 26, a frame 28, wheels 30, and an air source 32. The towing hitch 24 is coupled between the tool frame 14 and the air cart frame 28, which enables the air cart 12 to be towed with the agricultural implement 10. Additionally, the storage tank 26 may centrally store the product. In some embodiments, the storage tank 26 may include multiple compartments for storing different types of products. For example, a first compartment may store seeds, while a second compartment may store a dry fertilizer. In such configurations, the air cart 12 may deliver both seed and fertilizer to the implement 10 via separate product delivery systems, or as a mixture through a single product delivery system. In certain embodiments, the air cart may include multiple tanks (e.g., a first tank for storing seeds and a second tank for storing dry fertilizer, etc.). In such embodiments, each tank may include one or more compartments.

From the storage tank 26, the product (e.g., seeds) is fed into a metering system 33, which meters the seeds into respective hoses 34. The hoses 34 convey the seeds to the headers 18 via an air flow through the hoses. As depicted, the metering system 33 is mounted below the storage tank 26. In certain embodiments, the metering system 33 may include one or more meter rollers (e.g., driven to rotate by hydraulic motor(s), electric motor(s), a mechanical coupling to an air cart wheel, etc.). The air flow through the hoses 34 is provided by the air source 32, which is pneumatically coupled to the hoses 34 via a plenum 36. In some embodiments, the air source 32 may be a pump or blower powered by an electric or hydraulic motor, for example.

In certain embodiments (e.g., embodiments in which the air cart is towed behind the implement, embodiments in which the air cart is towed in front of the implement, etc.), the air source and/or the plenum may be mounted to a rear portion of the air cart (e.g., relative to a direction of travel 38). In further embodiments (e.g., embodiments in which the air cart is towed in front of the implement, embodiments in which the air cart is towed behind the implement, etc.), the air source and/or the plenum may be mounted to a front portion of the air cart (e.g., relative to the direction of travel 38). Furthermore, in embodiments in which the air cart includes multiple product delivery systems, multiple air sources and/or plenums may be utilized. For example, if the air cart includes two separate product delivery systems for separately distributing seeds and fertilizer to the ground engaging opener assemblies, the air cart may include two air sources and two plenums (e.g., one air source and one plenum for each product delivery system). In embodiments in which the air cart includes a single product delivery system (e.g., in which one or more products are metered from one or more metering systems into each pneumatic hose), a single air source and/or a single plenum may be utilized. In certain embodiments, multiple air sources and/or multiple plenums may provide an air flow to multiple groups of hoses (e.g., one group of hoses coupled to each plenum). In such embodiments, corresponding hoses from each group may merge in the metering system, thereby establishing a combined flow to the implement.

Figure 2:
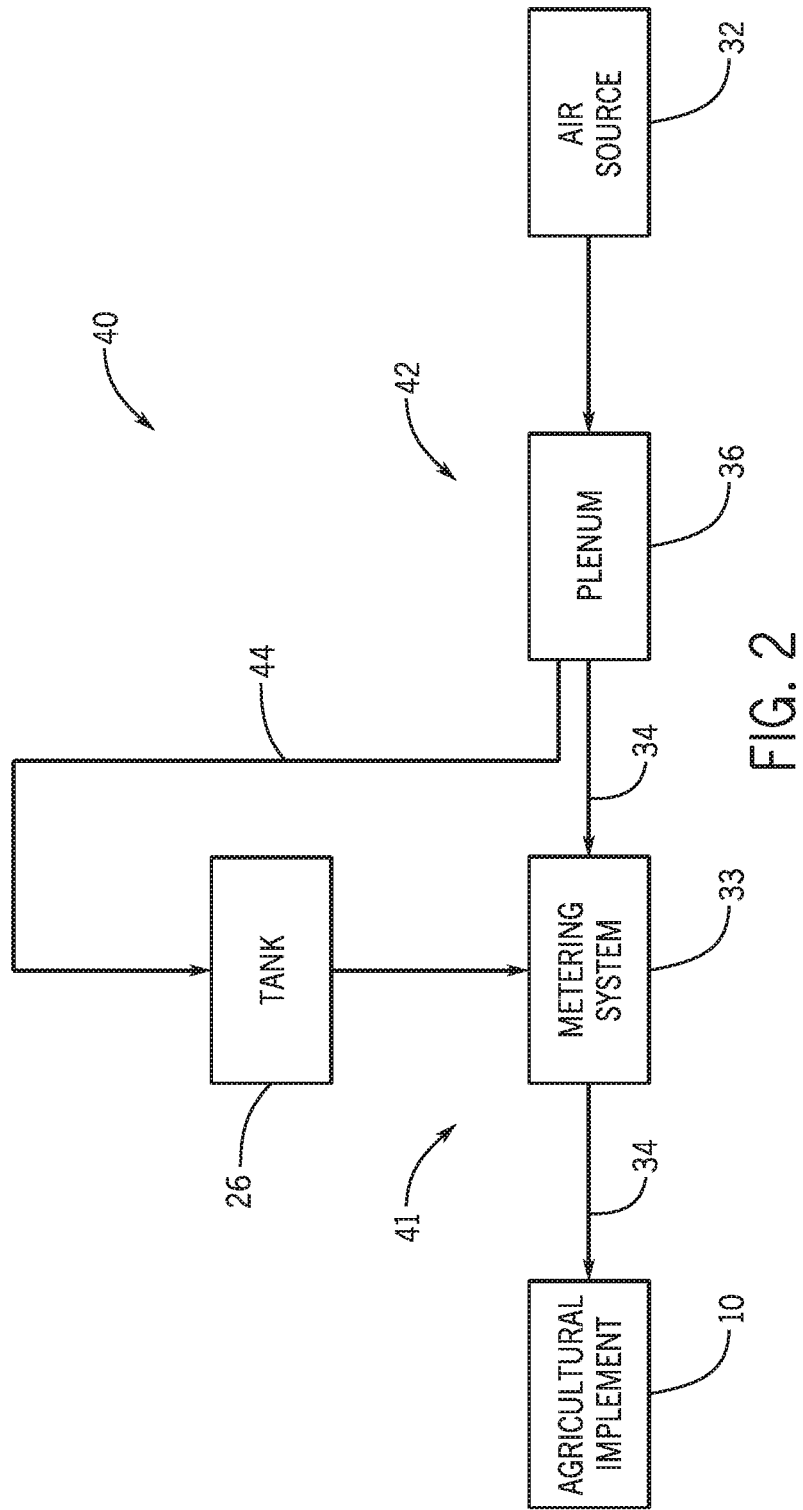
FIG. 2 is a block diagram of an embodiment of a seeding system configured to supply pressurized air and seeds to the agricultural implement of FIG. 1 and to supply pressurized air to a tank of the air cart of FIG. 1.

FIG. 2 is a block diagram of an embodiment of a seeding system 40 configured to supply pressurized air and seeds to the agricultural implement of FIG. 1 and to supply pressurized air to the tank of the air cart of FIG. 1. In certain embodiments, the seeding system 40 includes a product delivery system 41 configured to distribute granular product and air to the agricultural implement 10. In addition, the seeding system 40 includes an air distribution system 42 configured to supply pressurized air to the product delivery system 41 and to the tank 26 of the air cart. In the illustrated embodiment, the air distribution system 42 includes the air source 32 and the plenum 36, and the air source 32 is configured to supply a flow of pressurized air to the plenum 36. As will be described in detail below, the plenum 36 is configured to receive the air from the air source 32 and to distribute the air throughout the product delivery system 41. In the illustrated embodiment, the hoses 34 couple to the plenum 36 to direct air from the plenum 36 to the metering system 33 of the product delivery system 41. The plenum 36 may couple to 1, 2, 3, 4, 5, 6, 7, 8, 9, 10, 11, 12, 13, 14, 15, 16, or any suitable number of hoses 34 to distribute air to the metering system 33. Moreover, a pressurization hose 44 extends from the plenum 36 to the tank 26. In certain embodiments, the pressurization hose 44 may supply air to multiple tanks (e.g., in a serial configuration or a parallel configuration). In such embodiments, the air flow to each tank may be controlled by valves. As mentioned above, the tank 26 is pressurized to enhance seeding and/or metering operations. For example, seeds may flow from the tank 26 to the metering system 33 through inlets into the metering system. The air pressure within the tank 26 may be greater than the air pressure within the metering system 33 at the inlets (e.g., due to the reduced cross-sectional area of the air flow paths through the metering system at the inlets). The pressure differential may encourage seeds to flow from the tank into the metering system.

Moreover, the tank 26 is configured to supply seeds to the metering system 33. In certain embodiments, the metering system 33 is coupled directly to the tank 26. For example, the metering system 33 may be integral with the tank 26. The metering system 33 is configured to receive the seeds from the tank 26 and to control a flow of the seeds into the hoses 34, which receive the air flow from the plenum 36. The seeds and pressurized air combine in the metering system 33, and the pressurized air carries and/or directs the seeds toward the ground engaging opener assemblies of the agricultural implement for depositing seeds into the soil. In certain embodiments, each hose 34 may include multiple sections (e.g., one section extending from the plenum to the metering system and another section extending from the metering system to the header). Each section may be formed from a flexible conduit or a substantially rigid line. Each hose may be formed from any suitable number of sections (e.g., including one or more flexible conduits and/or one or more substantially rigid lines, etc.).

Figure 3:
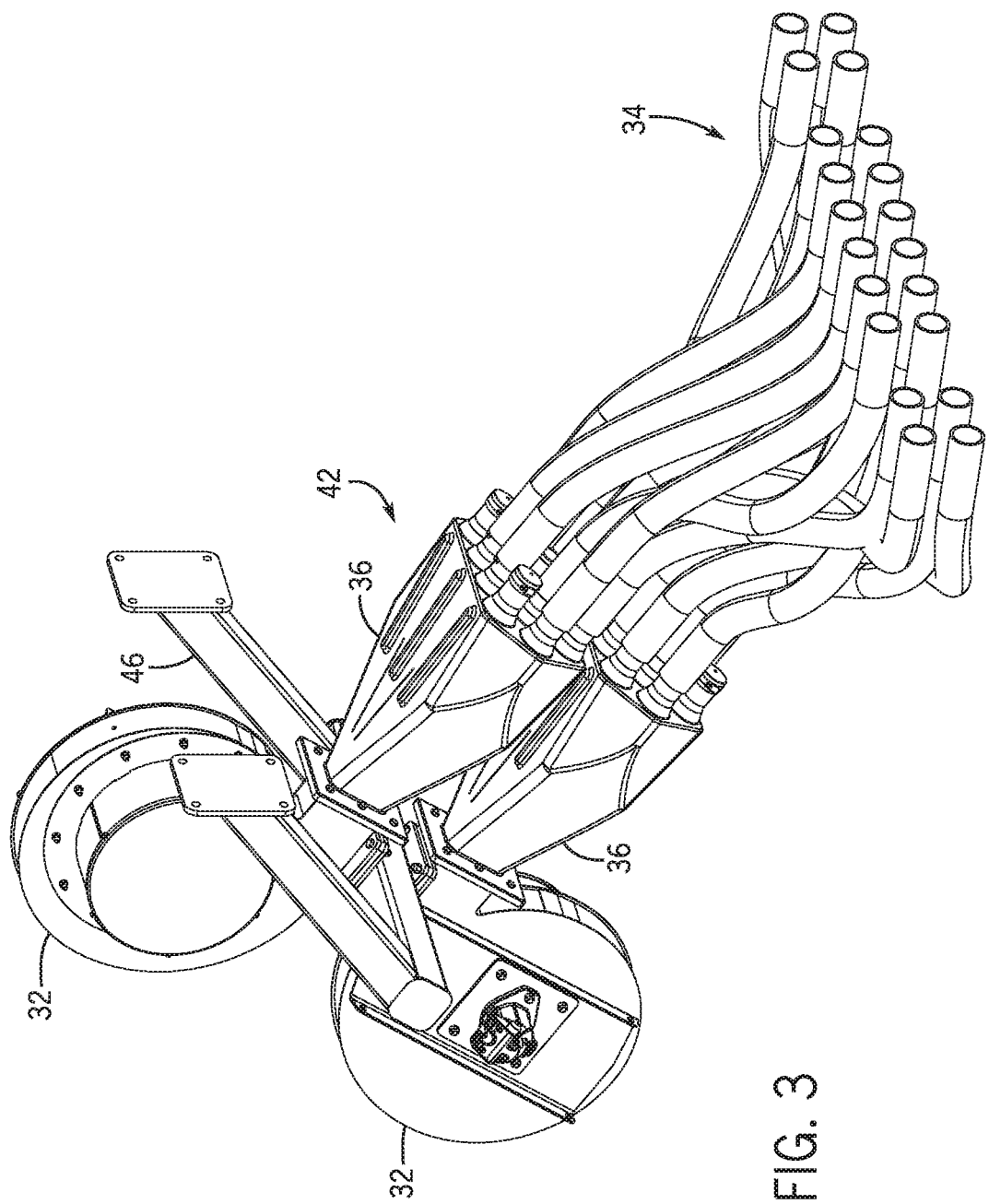
FIG. 3 is a perspective view of a portion of an air distribution system that may be employed within the seeding system of FIG. 2.

FIG. 3 is a perspective view of a portion of an air distribution system 42 that may be employed within the seeding system of FIG. 2. In the illustrated embodiment, the air distribution system 42 includes two air sources 32, two plenums 36 and a support frame 46. The support frame 46 is configured to couple to the frame of the air cart to support the air sources 32 and the plenums 36. In the illustrated embodiment, each air source 32 is coupled to the support frame 46, and each plenum 36 is coupled to a respective air source 32. However, it should be appreciated that in alternative embodiments, the plenums, or the air sources and the plenums, may be coupled to the support frame. As illustrated, hoses 34 are coupled to respective outlet ports of each plenum 36 and configured to direct the air from the plenums to the product delivery system (e.g., each plenum may be configured to direct air toward a respective metering system of the product delivery system). As previously discussed, the seeds and pressurized air combine in the metering system, and the pressurized air carries and/or directs the seeds toward the ground engaging opener assemblies of the agricultural implement for depositing seeds into the soil. While the illustrated embodiment includes two plenums 36 (e.g., one for each metering system), it should be appreciated that in certain embodiments, the air distribution system may include more or fewer plenums (e.g., 1, 2, 3, 4, 5, 6, or more). For example, in certain embodiments, the top plenum and top air source (e.g., the plenum and the air source above the lateral bar of the support frame) or the bottom plenum and bottom air source (e.g., the plenum and the air source below the lateral bar of the support frame) may be omitted. Furthermore, while a single air source is pneumatically coupled to each plenum in the illustrated embodiment, it should be appreciated that in alternative embodiments, multiple air sources (e.g., 2, 3, 4, or more) may be pneumatically coupled to each plenum. For example, in certain embodiments, the air distribution system 42 may include a single plenum and two air sources pneumatically coupled to the single plenum for providing the air flow.

Figure 4:
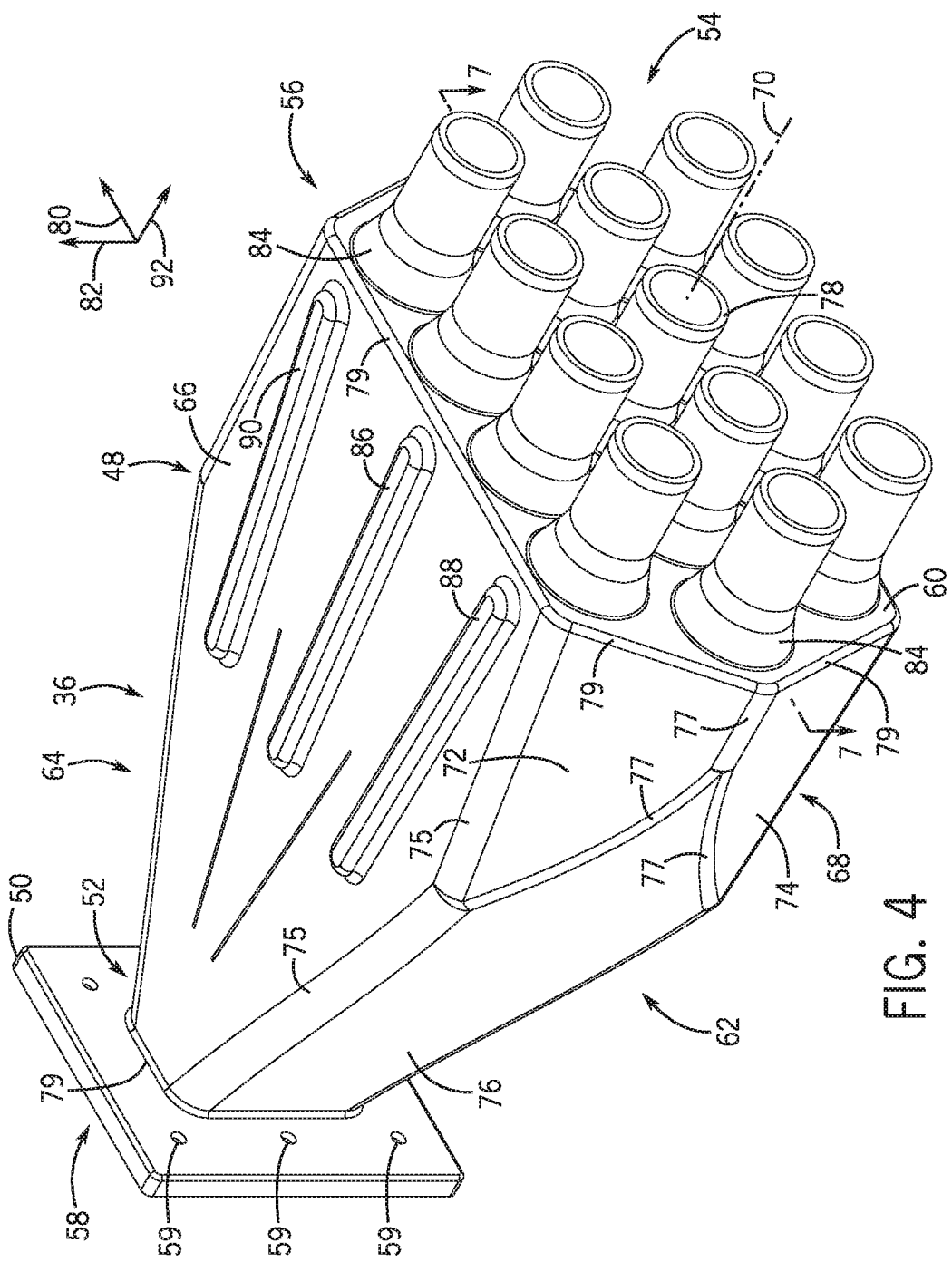
FIG. 4 is a perspective view of an embodiment of a plenum that may be employed within the air distribution system of FIG. 3.

FIG. 4 is a perspective view of an embodiment of a plenum that may be employed within the air distribution system of FIG. 3. In the illustrated embodiment, the plenum 36 includes a body 48 and a flange 50 positioned at a first end 52 of the body 48. The plenum 36 also includes outlet ports 54 positioned at a second end 56 of the body 48. In the illustrated embodiment, the plenum 36 includes an inlet 58 configured to fluidly couple to the air source (e.g., via coupling of the flange 50 to a body of the air source) and to direct air from the air source into the plenum 36. As illustrated, the flange 50 includes apertures 59 configured to rigidly couple the plenum 36 to a body of a respective air source (e.g., via fasteners). However, in other embodiments, the flange 50 may be welded, clamped, or otherwise secured to the air source or conduit. Moreover, in certain embodiments, the flange may be coupled to a hose or duct that supplies air from the air source.

In the illustrated embodiment, the outlet ports 54 are configured to couple to the hoses to supply pressurized air to the metering system and, as a result, to the agricultural implement. For example, the hoses 34 may be clamped or otherwise coupled to the outlet ports 54. The outlet ports 54 are generally cylindrical and positioned on a face element 60 at the second end 56 of the plenum body 48. In the illustrated embodiment, the face element 60 is substantially hexagonal. However, it should be appreciated that in alternative embodiments, the face element may be elliptical, octagonal, circular, rectangular, square, diamond, or any other suitable shape.

The body 48 of the plenum 36 is formed by a first side 62 and a second side 64, each coupled to a top element 66 and a bottom element 68. In the illustrated embodiment, the first and second sides 62, 64 are substantially mirrored or symmetrical about a longitudinal centerline 70. Additionally, the top and bottom elements 66, 68 are also mirrored about the longitudinal centerline 70. However, in other embodiments, the first and second sides 62, 64 and/or the top and bottom elements 66, 68 may be asymmetrical about the longitudinal centerline 70. For example, an asymmetrical plenum may establish desired flow characteristics at the outlet ports 54 for certain air sources (e.g., air sources that generate asymmetrical air flows). In addition, an asymmetrical plenum may be employed to turn the air flow from the inlet to the outlet ports. For example, the plenum body may be shaped such that the face element and the outlet ports are oriented at an angle relative to the inlet (e.g., at a 45 degree angle, at a 90 degree angle, etc.). As used herein, flow characteristics may refer to the pressure, velocity, flow rate, or a combination thereof, of air flow. In the illustrated embodiment, the first and second sides 62, 64 each include a first section 72, a second section 74, and a third section 76. In the illustrated embodiment, the first section 72 and the second section 74 are substantially flat, on the first and second sections 72 and 74 are connected to the face element 60, and only the third section 76 is connected to the flange 50. While each side includes three sections in the illustrated embodiment, it should be appreciated that in alternative embodiments, each side may include more or fewer sections (e.g., 1, 2, 3, 4, 5, 6, 7, 8, or more).

In the illustrated embodiment, edges 75 between the first and second sides 62, 64 and the top and bottom elements 66, 68 (e.g., the edge 75 between the third section 76 of the first side 62 and the top element 66, the edge 75 between the first section 72 of the first side 62 and the top element 66, etc.) are rounded or arcuate. In addition, transitions 77 between sections of each side (e.g., the transition 77 between the first section 72 and the third section 76 of the first side 62, the transition 77 between the first section 72 and the second section 74 of the first side 62, etc.) are rounded or arcuate. However, in other embodiments, the edges 75 and/or transitions 77 may be chamfered, angled, or any other suitable shape to enhance the structural integrity of the plenum 36, to enhance the air distribution properties of the plenum 36, to facilitate the assembly and/or production of the plenum 36, to reduce the pressure drop through the plenum 36, or a combination thereof. Moreover, in the illustrated embodiment, transitions 79 are formed at the interface between the sides 62, 64 and the face element 60, between the sides 62, 64 and the flange 50, between the top and bottom elements 66, 68 and the face element 60, and between the top and bottom elements 66, 68 and the flange 50. In the illustrated embodiment, the transitions 79 are generally rounded or arcuate. However, in other embodiments, the transitions 79 may be chamfered, linear, angled, or any other suitable shape to enhance the structural integrity of the plenum 36, to enhance the air distribution properties of the plenum 36, to facilitate the assembly and/or production of the plenum 36, to reduce the pressure drop through the plenum 36, or a combination thereof.

While the top element 66 and the bottom element 68 are substantially flat in the illustrated embodiment, it should be appreciated that in alternative embodiments, the top element and/or the bottom element may be contoured to establish desired air flow characteristics at the outlet ports 54. For example, in certain embodiments, the top element and/or the bottom element may include one or more substantially linear portions and/or one or more curved portions. For example, the top element and/or the bottom element may have a continuous curve between the flange 50 (e.g., at the first end 52) and the face element 60 (e.g., at the second end 56).

Turning to the outlet ports 54, in the illustrated embodiment, the outlet ports 54 are positioned in an approximately symmetrical arrangement relative to the longitudinal centerline 70. Accordingly, the outlet ports 54 are positioned on opposite lateral sides of a pressurization port 78. In the illustrated embodiment, the pressurization port 78 is centered laterally (e.g., centered along a lateral axis 80) and vertically (e.g., centered along the vertical axis 82) on the face element 60. For example, in the illustrated embodiment, the longitudinal centerline 70 is coaxial with the pressurization port 78. However, it should be appreciated that in alternative embodiments, the pressurization port may be positioned at other locations on the face element (e.g., vertically and/or laterally offset from the longitudinal centerline). For example, the pressurization port may be laterally centered on the face element, and vertically offset from the longitudinal centerline. The pressurization port 78 is configured to direct an air flow to the tank(s) to maintain a positive pressure within the tank(s) during seeding operations. Moreover, by providing the pressurization port 78 in a central region of the face element 60 (e.g., laterally centered on the face element 60), seed flow to various portions of the implement may be controlled without significantly impacting the pressurization of the tank(s). For example, when seed flow to certain ground engages assemblies is disabled, air flow through the hoses that supply the disabled ground engages assemblies may increase due to the reduced resistance associated with termination of the seed flow through the hoses. Because the pressurization port 78 is centered laterally on the face element 60, the pressurization port 78 may receive a sufficient air flow despite the air flow imbalance between outlet ports 54. Accordingly, the pressure within the tank(s) may be maintained, thereby maintaining the accuracy of seed metering into the hoses.

In embodiments in which the air cart includes multiple tanks, each tank may be pressurized during control of seed flow to various portions of the implement (e.g., via a respective plenum, via a network of lines extending from the pressurization line, via multiple pressurization lines extending from multiple pressurization ports of a single plenum, etc.). In the illustrated embodiment, each outlet port 54 includes an outlet transition 84 extending between the outlet port 54 and the face element 60. For example, the transition 84 may be rounded, tapered, or chamfered, among other shapes/profiles. In certain embodiments, the outlet transition 84 may include a fitting configured to couple the outlet port 54 to the face element 60. However, in other embodiments, the outlet ports 54 and/or the pressurization port 78 (e.g., including the respective transitions) may be integrally formed with the body 48 of the plenum 36. For example, in certain embodiments, the plenum 36 may be a single piece formed from a metal (e.g., via a casting process), polymer (e.g., via a rotational molding (rotomolding) process), or any other suitable material. The hoses are configured to couple to the outlet ports 54 such that desired flow characteristics (e.g., a desired pressure profile and uniform velocity) is provided to the agricultural implement via the hoses.

In the illustrated embodiment, three ribs 86, 88, and 90 are formed on the top element 66 of the plenum body 48. In addition, as discussed in detail below, three corresponding ribs are formed on the bottom element 68 of the plenum body 48. The ribs are configured to enhance the structural rigidity of the top and bottom elements. For example, air flowing through the inlet 58 may cause the plenum 36 to become pressurized, thereby establishing a load on each side/element of the plenum 36. The ribs on the top and bottom elements may enable the elements to resist the pressure load, thereby substantially reducing deformation of the elements. As a result, the flow characteristics at the outlet ports 54, which may be affected by the shape of the top and bottom elements 66, 68, may be substantially maintained while the plenum 36 is pressurized.

In the illustrated embodiment, the plenum 36 includes the first rib 86 extending along a longitudinal axis 92 and is substantially aligned with the longitudinal centerline 70, the second rib 88 is positioned proximate to the first side 62, and the third rib 90 is positioned proximate to the second side 64. As discussed in detail below, each rib is substantially aligned with the air flow proximate to the rib. In addition, each rib is particularly shaped to reduce the effect of the rib on the flow characteristics at the outlet ports 54 and/or to facilitate manufacturing of the plenum 36 (e.g., to reduce manufacturing costs). While the illustrated embodiment includes three ribs, it should be appreciated that more or fewer ribs may be utilized in alternative embodiments. For example, in certain embodiments, 1, 2, 3, 4, 5, 6, or more ribs may be formed on the top element 66 and/or the bottom element 68.

In the illustrated embodiment, the plenum 36 is formed by a rotational molding (rotomolding) process. For example, in certain embodiments, the body 48, the flange 50, the outlet ports 54, and the pressurization port 78 may be formed from a single piece of polymeric material via the rotational molding process. In addition, the ribs may be formed on the top and bottom elements by the rotational molding process (e.g., the rotational mold/tool may include recesses that correspond to the ribs). By forming the body 48, the flange 50, the outlet ports 54, the pressurization port 78, and the ribs 86, 88, 90 from a single piece of material via a rotational molding process, the manufacturing cost of the plenum 36 may be significantly reduced, as compared to plenums formed by coupling multiple separately formed components to one another. However, in certain embodiment, the face element of the body, the outlet ports, and the pressurization port may be formed separately from the remainder of the body and the flange (e.g., the remainder of the body and the flange formed by a rotomolding process). In such embodiments, the face element (e.g., with the ports attached) may be coupled to the remainder of the body (e.g., by fasteners, etc.).

Figure 5:
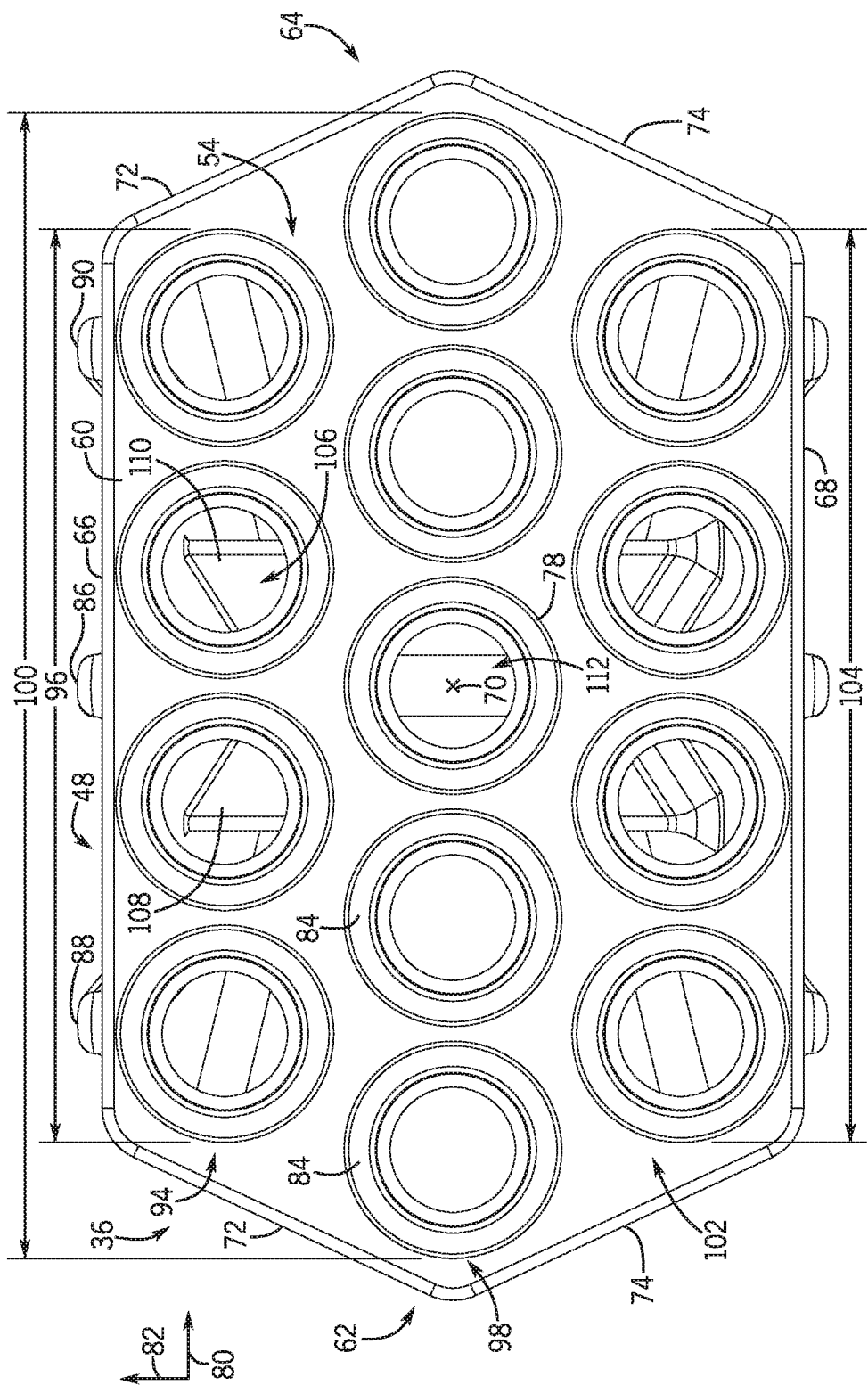
FIG. 5 is a front view of the plenum of FIG. 4.

FIG. 5 is a front view of the plenum of FIG. 4. As described above, the outlet ports 54 are arranged on the face element 60 in a substantially symmetrical arrangement relative to the longitudinal centerline 70. In the illustrated embodiment, the outlet ports 54 are arranged on the face element 60 in a first row 94 having a first length 96 (e.g., extent of the outlet ports 54 of the first row 94 along the lateral axis 80, including the transitions 84), the outlet ports 54 and the pressurization port 78 are arranged on the face element 60 in a second row 98 having a second length 100 (e.g., extent of the outlet ports 54 and the pressurization port 78 of the second row 98 along the lateral axis 80, including the transitions 84), and the outlet ports 54 are arranged on the face element 60 in a third row 102 having a third length 104 (e.g., extent of the outlet ports 54 of the third row 102 along the lateral axis 80, including the transitions 84). While the transitions 84 are included in the length of each row, it should be appreciated that in certain embodiments, the length may be determined without considering lateral extent of the transitions. The first row 94 is positioned proximate to the top element 66, the third row 102 is positioned proximate to the bottom element 68, and the second row 98 is positioned between the first row 94 and the third row 102. As illustrated, the second length 100 is greater than the first length 96 and the third length 104, and a shape of the face element 60 is configured to accommodate the first length 96 of the first row 94, the second length 100 of the second row 98, and the third length 104 of the third row 102.

The shape of the face element 60 may be particularly selected to reduce surface area (e.g., the area of the face element that is not open to the ports). Reducing the surface area of the face element 60 may reduce the turbulence caused by contact between the air flow and the face element. In the illustrated embodiment, the shape of the face element 60 is substantially hexagonal. Accordingly, the surface area of the face element may be less than the surface area of a rectangular face element (e.g., which may include additional surface area at the ends of the first and third rows), thereby reducing turbulence. While the illustrated face element is substantially hexagonal in the illustrated embodiment, it should be appreciated that in alternative embodiments, the face element may be elliptical, octagonal, circular, rectangular, square, diamond, or any other suitable shape.

In the illustrated embodiment, the first row 94 includes four outlet ports 54, the second row 98 includes four outlet ports 54 and the pressurization port 78 (i.e., five total ports), and the third row 102 includes four outlet ports 54. As illustrated, the pressurization port 78 is laterally centered on the second row 98. Accordingly, two outlet ports 54 are positioned on a first lateral side of the pressurization port 78, and two outlet ports 54 are positioned on a second lateral side of the pressurization port 78, opposite the first lateral side. As a result, each row includes four outlet ports 54, and the second row 98 includes the pressurization port 78. By positioning the pressurization port 78 in the second row 98 and laterally centering the pressurization port 78 within the second row 98, the pressurization port is centered along the lateral axis 80 and the vertical axis 82 on the face element 60 of the plenum 36. Therefore, the pressurization port 78 may receive a sufficient air flow despite an air flow imbalance between outlet ports 54 (e.g., resulting from controlling seed flow to various portions of the implement). Accordingly, the pressure within the tank may be maintained, thereby maintaining the accuracy of seed metering into the hoses. Moreover, including the same number of outlet ports 54 in each row may enable the desired flow characteristic through each outlet port to be achieved.

While the illustrated plenum includes four outlet ports on each row, it should be appreciated that in alternative embodiments, each row may include more or fewer outlet ports. For example, each row may include 1, 2, 3, 4, 5, 6, 7, 8, or more outlet ports. In addition, while each row includes the same number of outlet ports in the illustrated embodiment, it should be appreciated that in alternative embodiments, the number of outlet ports of each row may vary. For example, in certain embodiments, the second row may include more outlet ports than the first row and/or the third row, or the first row and/or the third row may include more outlet ports than the second row. Furthermore, while the illustrated embodiment include three row of ports, it should be appreciated that in alternative embodiments the plenum may include more or fewer rows (e.g., 1, 2, 3, 4, 5, 6, or more) extending from the face element. For example, an additional row may be positioned between the second row and the third row, in which the additional row includes four outlet ports and a centrally positioned pressurization port, and in which the pressurization port of the additional row is configured to supply pressurized air to a second tank. In addition, while the second row includes a single pressurization port in the illustrated embodiment, it should be appreciated that in alternative embodiments, the second row may include more or fewer pressurization ports (e.g., 0, 1, 2, 3, 4, or more). For example, the second row may include two pressurization ports positioned adjacent to one another with the pair of pressurization ports centered along the lateral axis. The length of each row may be based at least in part on the number of ports within the row.

While the illustrated embodiment includes twelve outlet ports 54, in other embodiments 1, 2, 3, 4, 5, 6, 7, 9, 10, 11, 12, 13, 14, 15, or any suitable number of outlet ports 54 may be included to provide air flow to the agricultural implement 10. Moreover, in certain embodiments, the outlet ports 54 are arranged asymmetrically on the face element 60. For example, the spacing between adjacent outlet ports may be unequal. Furthermore, in other embodiments, the outlet ports 56 may be arranged on the first side 62, the second side 64, the top element 66, and/or the bottom element 68 based on desired air flow through the outlet ports 56. In addition, while the illustrated embodiment includes a single pressurization port 78, it should be appreciated that in alternative embodiments, the plenum 36 may include 2, 3, 4, 5, 6, or more pressurization ports 78 (e.g., each laterally centered on the face element, each positioned proximate to the longitudinal axis/centerline, etc.). In such embodiments, certain pressurization ports may supply air to respective tanks, and/or multiple pressurization ports may supply air to a single tank.

As will be described in detail below, the plenum 36 includes a baffle assembly 106 configured to direct air flow from the inlet to the outlet ports 54. In the illustrated embodiment, the baffle assembly 106 includes a first baffle 108 and a second baffle 110 disposed within the plenum 36. The first and second baffles 108, 110 are arranged at an angle, relative to one another, such that a first passage 112 is formed between the first and second baffles 108, 110. The first passage 112 directs air flow down the longitudinal axis, while also enabling flow around either side of the first and second baffles 108, 110.

The baffle assembly 106 is configured to produce desired flow characteristics (e.g., a pressure profile and uniform velocity/flow rate) through the plenum 36. For example, the baffle assembly 106 may be configured to direct the air flow through the plenum 36 such that different outlet ports 54 direct air toward the agricultural implement 10 at different pressures (e.g., to account for different lengths of the hoses 34). By way of example, longer hoses (e.g., based on the total length of the hose from the plenum to the header of the implement) may be coupled to the outlet ports 54 providing higher pressures to account for line losses and to reduce the likelihood of plugging in the hoses.

In the illustrated embodiment, each outlet port 54 and the pressurization port 78 is aligned with the longitudinal axis. However, it should be appreciated that in alternative embodiments, certain ports may be angled relative to the longitudinal axis. For example, in certain embodiments, the ports of the top row may be angled upwardly, and/or the ports of the bottom row may be angled downwardly. Such an arrangement may facilitate coupling the hoses to the plenum and/or provide the desired flow characteristics through each port.

Figure 6:
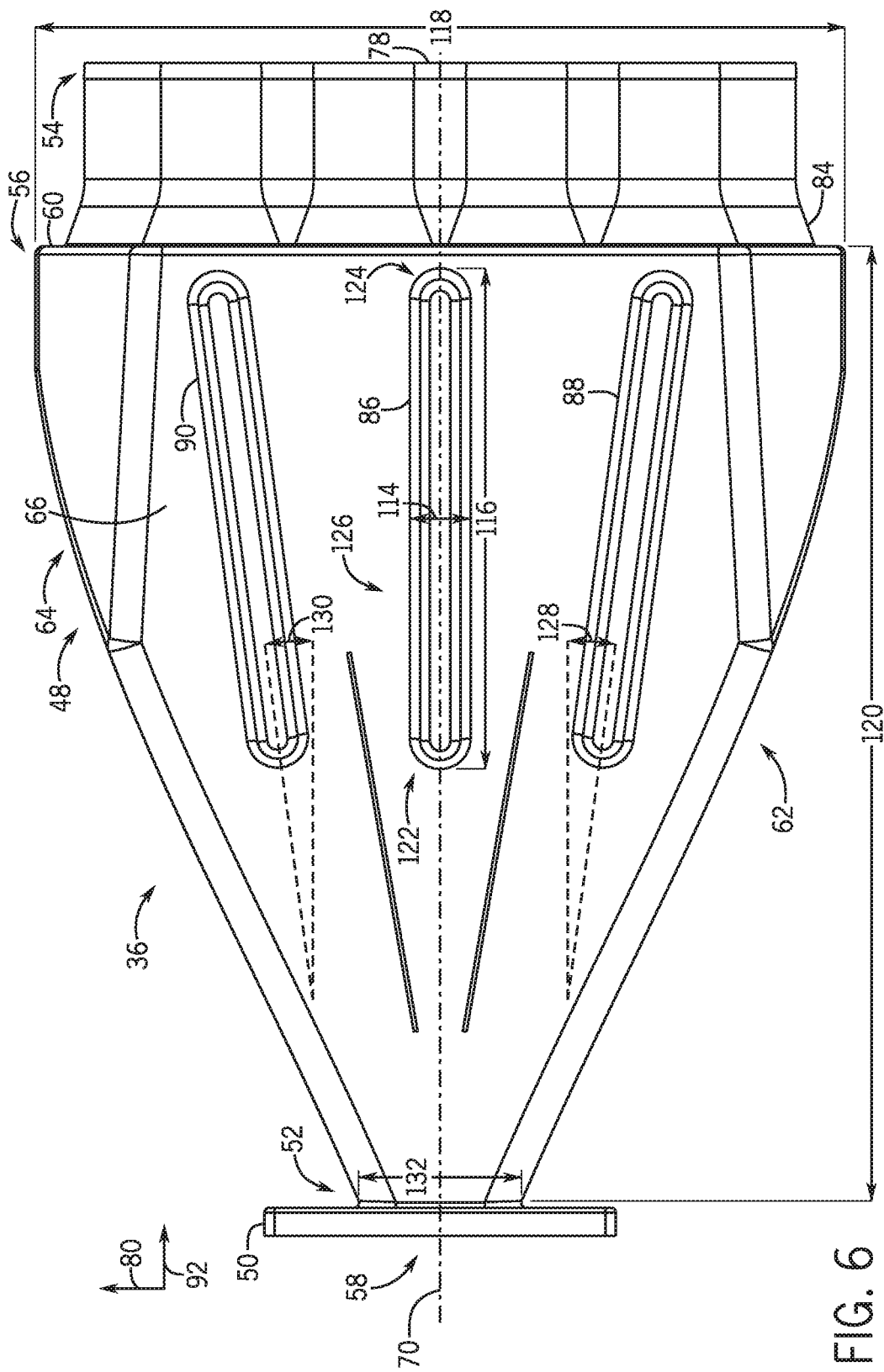
FIG. 6 is a top view of the plenum of FIG. 4.

FIG. 6 is a top view of the plenum 36 of FIG. 4. As illustrated, the first rib 86 is substantially aligned with the longitudinal centerline 70. A width 114 of the first rib 86 and a length 116 of the first rib 86 may be particularly selected to enhance the structural rigidity of the top element 66 without substantially interfering with the air flow through the plenum 36. For example, the width 114 of the first rib 86 may be about 1 percent, about 2 percent, about 3 percent, about 4 percent, about 5 percent, or more of a width 118 of the face element 60. By way of further example, the width 114 of the first rib 86 may be about 1 to 10 percent, about 2 to 9 percent, or about 3 to 8 percent of the width 118 of the face element 60. In addition, the length 116 of the first rib 86 may be about 10 percent, about 20 percent, about 30 percent, about 40 percent, about 50 percent, or more of a length 120 of the plenum body 48. By way of further example, the length 116 of the first rib 86 may be about 10 to 50 percent, about 15 to 45 percent, or about 20 to 40 percent of the length 120 of the plenum body 48. Furthermore, the first rib 86 includes a rounded leading edge 122, a rounded trailing edge 124, and rounded side edges 126. The rounded edges may substantially reduce the pressure drop of the air flow through the plenum 36, thereby substantially maintaining the desired flow characteristics at the outlet ports 54.

In the illustrated embodiment, the shapes of the second rib 88 and the third rib 90 are substantially the same as the shape of the first rib 86. That is, the length and width of the second and third ribs 88, 90 are substantially equal to the length and width of the first rib 86. In addition, the second and third ribs 88, 90 each include a rounded leading edge, a rounded trailing edge, and rounded side edges. However, it should be appreciated that in certain embodiments, the shape/configuration of the second rib 88 and/or the third rib 90 may be different than the shape/configuration of the first rib 86. For example, in certain embodiments, the width of the second rib 88 and/or the third rib 90 may be different than the width of the first rib 86. For example, the width of each rib may be selected such that the rib is as wide as possible without contacting one of the baffles or a side of the plenum body. In addition, the length of the second rib 88 and/or the third rib 90 may be different than the length of the first rib 86.

In the illustrated embodiment, the second rib 88 is oriented at an angle 128 relative to the longitudinal axis 92. In addition, the third rib 90 is orientated at an angle 130 relative to the longitudinal axis 92. The angles 128 and 130 may be particularly selected such that the effect of the ribs on the air flow through the plenum is substantially reduced. For example, each rib may be substantially oriented in the direction of the air flow proximate to the respective rib. Such an orientation may substantially reduce the pressure loss proximate to the rib, thereby substantially maintaining the desired flow characteristics at the outlet ports 54. By way of example, the angles 128 and 130 may be about 2 degrees, about 4 degrees, about 6 degrees, about 10 degrees, about 45 degrees, or more. By way of further example, the angles 128 and 130 may be about 1 to 45 degrees, about 2 to 30 degrees, about 3 to 20 degrees, or about 4 to 10 degrees. While the angles 128 and 130 are equal to one another in the illustrated embodiment, it should be appreciated that the angles 128 and 130 may be different from one another in alternative embodiments (e.g., based on the direction of the air flow proximate to each rib). In addition, it should be appreciated that the first rib 86 may be oriented at an angle relative to the longitudinal axis 92 in certain embodiments.

While the ribs are substantially aligned with one another along the longitudinal axis 92, it should be appreciated that one or more ribs may be offset from one or more other ribs along the longitudinal axis 92. Furthermore, in the illustrated embodiment, the ribs 86, 88, and 90 protrude outwardly from the top element 66. However, it should be appreciated that in certain embodiments, one or more ribs may protrude inwardly into an interior of the plenum body. In such embodiments, the rib(s) may guide the air flow toward the outlet ports and/or toward the pressurization port. Furthermore, while the ribs extend perpendicularly to the top element 66, it should be appreciated that in certain embodiments, the ribs may extend outwardly or inwardly from the top element at an angle. Moreover, it should be appreciated that ribs (e.g., 1, 2, 3, 4, or more) may be formed on the first side 62 and/or the second side 64 of the plenum body 48, and/or on the face element 60. While the illustrated embodiment includes integrally molded ribs, it should be appreciated that in certain embodiments, separately formed ribs may be coupled to the plenum body.

In the illustrated embodiment, the first side 62 and the second side 64 establish a width 132 at the first end 52, which is smaller than the width 118 of the face element 60 at the second end 56. As used herein, width refers to an extent of the body 48 of the plenum 36 along the lateral axis 80. As illustrated, the first and second sides 62, 64 flare out from the inlet 58 to the face element 60. In addition, the section of each side may be shaped to establish desired air flow characteristics at the outlet ports 54.

Figure 7:
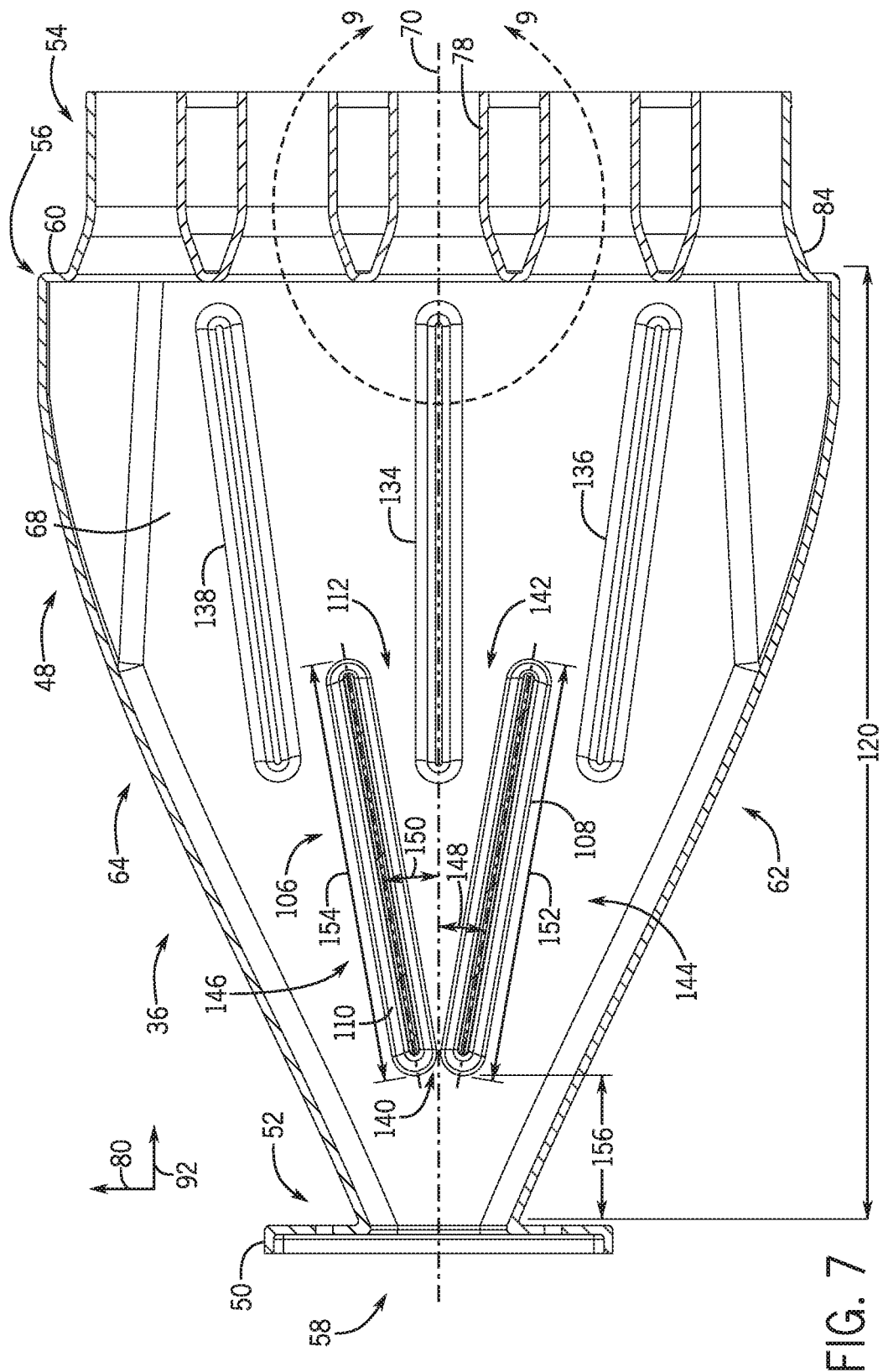
FIG. 7 is a sectional top view of the plenum of FIG. 4, taken along the line 7-7 of FIG. 4.

FIG. 7 is a sectional top view of the plenum of FIG. 4, taken along the line 7-7 of FIG. 4. In the illustrated embodiment, three ribs 134, 136, 138 are formed on the bottom element 68 of the plenum body 48. The shape/configuration of each rib of the bottom element is substantially the same as the shape/configuration of each rib of the top element. That is, the length and width of each rib of the bottom element are substantially equal to the length and width of each rib of the top element. Moreover, each rib of the bottom element includes a rounded lead edge, a rounded trailing edge, and rounded side edges. In addition, an angle of each rib of the bottom element is substantially equal to the angle of the corresponding rib of the top element. For example, the fourth rib 134 is substantially aligned with the longitudinal axis 92, an angle of the fifth rib 136 relative to the longitudinal axis 92 is substantially equal to the angle 128 of the second rib 88, and an angle of the sixth rib 138 relative to the longitudinal axis 92 is substantially equal to the angle 130 of the third rib 90. In addition, the position of each rib 134, 136, 138 relative to the bottom element 68 is substantially equal to the position of each rib 86, 88, 90 relative to the top element 66. Accordingly, the first rib 86 and the fourth rib 134 are symmetrical relative to the longitudinal centerline 70, the second rib 88 and the fifth rib 136 are symmetrical relative to the longitudinal centerline 70, and the third rib 90 and the sixth rib 138 are symmetrical relative to the longitudinal centerline 70. Furthermore, the ribs 134, 136, 138 protrude outwardly from the bottom element 68, and the ribs 134, 136, 138 are integrally formed with the plenum body (e.g., via a rotational molding process).

In certain embodiments, the shape/configuration of one or more ribs of the bottom element may be different than the shape/configuration of one or more ribs of the top element. For example, the length and/or width of one or more ribs of the bottom element may be different than the length and/or width of one or more ribs of the top element. In addition, an angle of one or more ribs of the bottom element may be different than the angle of the corresponding rib(s) of the top element. In addition, the position of one or more ribs 134, 136, 138 relative to the bottom element 68 may be different than the position of the corresponding rib(s) relative to the top element 66. Furthermore, in certain embodiments, one or more ribs 134, 136, 138 may protrude inwardly from the bottom element 68, thereby extending into the interior of the plenum body 48. Furthermore, while the ribs extend perpendicularly to the bottom element 68, it should be appreciated that in certain embodiments, the ribs may extend outwardly or inwardly from the bottom element at an angle. While the illustrated bottom element 68 includes three ribs, it should be appreciated that in alternative embodiments, the bottom element 68 may include more or fewer ribs. For example, in certain embodiments, the bottom element 68 may include more or fewer ribs than the top element 66.

In the illustrated embodiment, the baffle assembly 106 is positioned proximate to the first end 52 of the plenum body 48. However, in other embodiments, the baffle assembly 106 may be longitudinally centered within the plenum 36 (e.g., the baffle assembly 106 may be substantially equidistant from the first end 52 and second end 56), proximate to the second end 56 of the plenum 36, or in any other suitable location to direct the air flow to the outlet ports 54. As illustrated, the first baffle 108 and the second baffle 110 are angled, relative to one another (and to the longitudinal axis 92), to form the first passage 112. As a result, a first passage opening 140 is smaller than a second passage opening 142 (e.g., a cross-sectional area of the first passage opening 140 is less than a cross-sectional area of the second passage opening 142). As will be appreciated, the larger second passage opening 142 is configured to facilitate expansion of the flow within the first passage 112. Accordingly, different outlet ports 54 may receive the air flow with different pressures. Moreover, while the illustrated embodiment includes two baffles 108, 110, in other embodiments 0, 1, 3, 4, 5, 6, or any suitable number of baffles may be included to direct the air flow through the plenum 36. Supplying air to the outlet ports 54 with different pressures may enable the hoses having different lengths to obtain the desired flow characteristics and reduce the likelihood of plugging of the hoses.

The baffle assembly 106 extends from the bottom element 68 of the plenum 36 to the top element 66 of the plenum 36. As a result, the baffle assembly forms three flow passages. The first passage 112 is disposed between the first and second baffles 108, 110. A second passage 144 is formed between the first side 62 of the plenum body 48 and the first baffle 108, and a third passage 146 is formed between the second side 64 of the plenum body 48 and the second baffle 110. In certain embodiments, the first, second, and third passages 112, 144, 146 have varying flow characteristics based on the air flow from the air source. For example, the air source may introduce a high pressure air flow into the plenum 36 at the inlet 58 that is directed toward the first passage 112. However, the first and second baffles 108, 110 are configured to divert a portion of the air flow toward the second and third passages 144, 146. Additionally, the configuration of the baffle assembly 106 may modify the flow characteristics in each of the passages 112, 144, 146. For example, as the cross-sectional area of each flow passage increases, the velocity of the flow traveling through the passage decreases. Moreover, the baffle assembly 106 may be configured to dissipate flow vortices at the inlet 58 introduced by the air flow from the air source. Accordingly, the baffle assembly 106 may be configured to obtain desired flow characteristics within the plenum 36.

In the illustrated embodiment, the baffle assembly 106 is symmetrical about the longitudinal centerline 70. As such, the longitudinal centerline 70 is coaxial with the lateral center of the first passage 112. However, in other embodiments, the baffle assembly 106 may not be symmetric about the longitudinal centerline 70. For example, in certain embodiments the first baffle 108 may be arranged at a larger angle relative to the longitudinal axis 92 than the second baffle 110. To that end, the first baffle 108 is arranged at a first angle 148 relative to the longitudinal axis 92. Moreover, the second baffle 110 is arranged at a second angle 150 relative to the longitudinal axis 92. In certain embodiments, the first and second angles 148, 150 are equal. However, in other embodiments, the first and second angles 148, 150 are not equal. In the illustrated embodiment, the first angle 148 is approximately 5 degrees and the second angle 150 is approximately 5 degrees. However, in other embodiments, the first and second angles 148, 150 may be 2 degrees, 10 degrees, 20 degrees, 30 degrees, 40 degrees, 50 degrees, 70 degrees, 80 degrees, or any other angle suitable for the operating conditions. Moreover, in certain embodiments, the first and second angles 148, 150 may be between 2 degrees and 30 degrees, between 30 degrees and 50 degrees, between 50 degrees and 70 degrees, between 70 degrees and 90 degrees, or any other suitable range based on the operating conditions.

Moreover, the first and second baffles 108, 110 are configured to extend a distance along the length 120 of the plenum body 48 (e.g., an extent of the plenum body 48 along the longitudinal axis 92) to direct the air flow toward the outlet ports 54. For example, the first baffle 108 has a first length 152 and the second baffle 110 has a second length 154. In the illustrated embodiment, the first length 152 is equal to the second length 154. However, in other embodiments, the first length 152 may not be equal to the second length 154. For example, the first length 152 may be longer than the second length 154 to further direct the air flow down the second passage 144. In the illustrated embodiment, the first and second lengths 152, 154 are approximately 40 percent of the length 120 of the plenum body 48. However, in other embodiments, the first and second lengths 152, 154 may be 10 percent, 20 percent, 30 percent, 50 percent, 60 percent, 70 percent, 80 percent, 90 percent, or any suitable percentage of the length 120 of the plenum body 48. Additionally, the first and second lengths 152, 154 may be between 10 and 40 percent, 40 to 60 percent, 60 to 80 percent, or any suitable percentage of the length 120 of the plenum body 48. As will be appreciated, the first and second lengths 152, 154 may be varied to obtain desirable flow characteristics within the plenum 36.

Furthermore, in the illustrated embodiment, the baffle assembly 106 is positioned proximate to the first end 52 of the plenum 36. The first and second baffles 106, 108 are positioned at an offset distance 156 from the inlet 58. In the illustrated embodiment, the offset distance 156 is approximately 18 percent of the length 120 of the plenum body 48. However, in other embodiments, the offset distance 156 may be 5 percent, 10 percent, 20 percent, 30 percent, 40 percent, 50 percent, or any other suitable percentage of the length 120 to direct the air flow toward the outlet ports 54. Additionally, the offset distance 156 may be between 5 percent and 20 percent, 20 percent and 30 percent, 40 percent and 50 percent, or any other suitable range of percentages of the length 120 of the plenum body 48. In certain embodiments, the first baffle 108 and the second baffle 110 are an equal offset distance 156 from the inlet 58. However, in other embodiments, the first baffle 108 may be closer to the inlet 58 or the second baffle 110 may be closer to the inlet 58. As will be appreciated, the position of the baffle assembly 106 relative to the inlet 58 may be modified to obtain desirable flow characteristics in the plenum 36. Moreover, while the illustrated embodiment includes a fixed baffle assembly 106, in certain embodiments, the baffle assembly 106 and/or the individual baffles of the baffle assembly 106 (e.g., the first baffle 108 and/or the second baffle 110) may be adjustable. For instance, the first and second baffles 108, 110 may be disposed on a track that is configured to enable the first and second baffles 108, 110 to adjust the offset distance 156. Furthermore, the first and second angles 148, 150 may be adjustable. Additionally, in certain embodiments, the baffle assembly 106 may be automatically adjustable (e.g., via actuators) to provide air flow customization.

Accordingly, the air flow may be regulated (e.g., controlled) through the plenum 36 to distribute air to different outlet ports 54 at different velocities, flow rates, pressures, or a combination thereof. As previously discussed, the pressurization port 78 is configured to couple to the pressurization hose to pressurize the tank. In certain embodiments, the desired pressure to the tank may be less than the desired pressure of the hoses configured to direct the flow of air to the agricultural implement. Moreover, in certain embodiments, the flow rate to the tank may also be lower than the flow rate to the hoses. By utilizing a desirable configuration of the baffle assembly 106 and/or a desired shape of the plenum body 48, the flow rates and/or pressures at different parts of the plenum 36 may be regulated to satisfy a variety of desired pressure/flow conditions, such as providing the tank with lower pressure air at a lower flow rate than the air provided to the implement.

In certain embodiments, a valve may be fluidly disposed between the pressurization port and the tank (e.g., along the pressurization hose) to control the pressure within the tank. Furthermore, in the illustrated embodiment, the outlet ports 54 and the pressurization port 78, including the respective transitions 84, are integrally formed with the plenum body 48. However, it should be appreciated that in alternative embodiments, certain ports (e.g., including the respective transitions) may be formed separately and coupled to the plenum body (e.g., via welding, bonding, fasteners, etc.).

Figure 8:
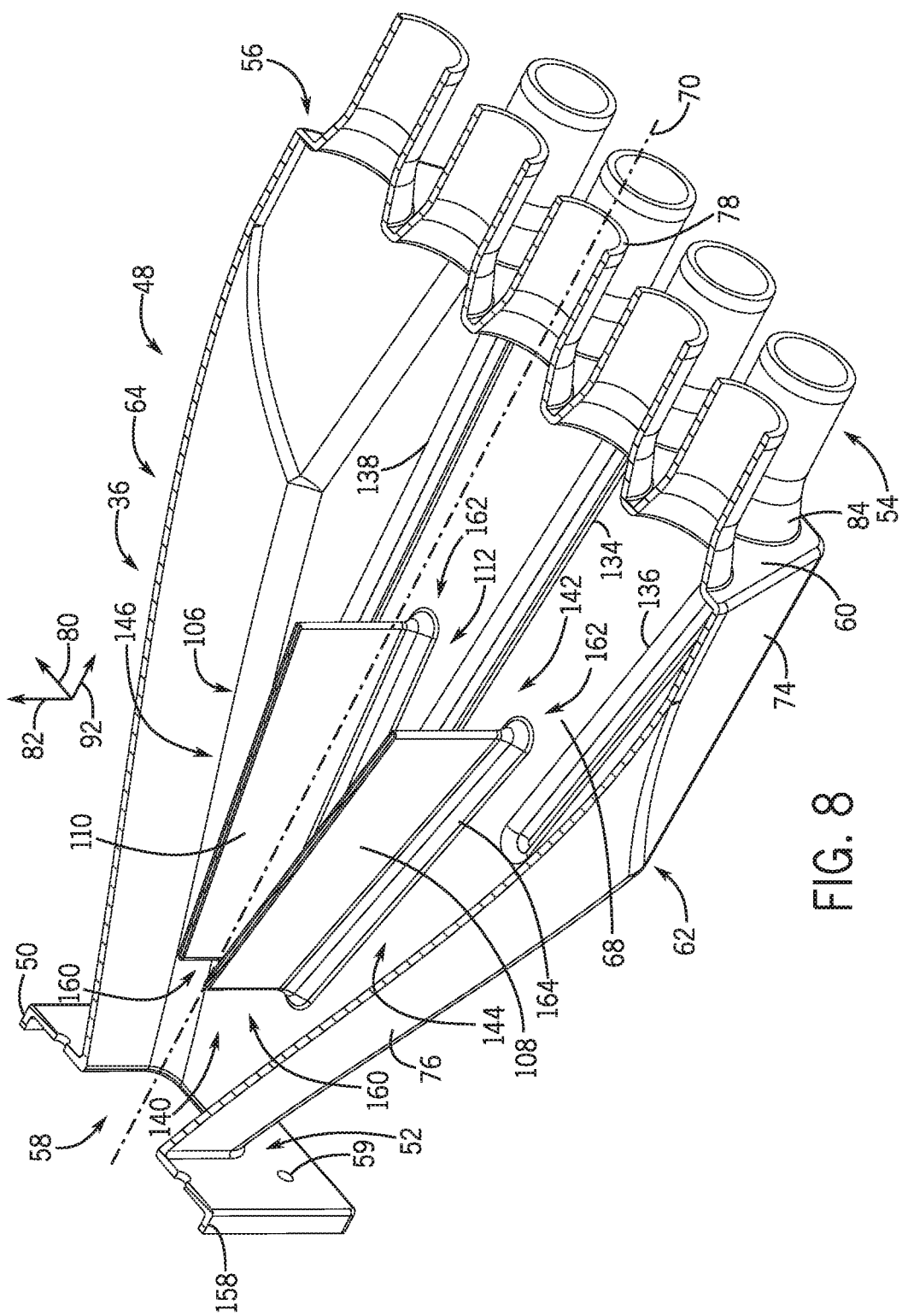
FIG. 8 is a cross-sectional perspective view of the plenum of FIG. 4, taken along line 7-7 of FIG. 4.

FIG. 8 is a cross-sectional perspective view of the plenum 36 of FIG. 4, taken along line 7-7 of FIG. 4. In the illustrated embodiment, the plenum body 48, the flange 50, the outlet ports 54, the pressurization port 78, and the ribs 86, 88, 90, 134, 136, 138 are formed from a single piece of material (e.g., via a rotational molding process). In the illustrated embodiment, the flange 50 includes a projection 158 that extends about a periphery of the flange 50. The projection 158 is configured to enhance the structural rigidity of the flange 50 and/or to maintain the flatness of a contact surface of the flange (e.g., to reduce warpage of the contact surface during a molding process), thereby substantially reducing air leakage between the flange 50 and the air source.

In the illustrated embodiment, the first baffle 108 and the second baffle 110 are integrally formed with the plenum body 48 (e.g., via the rotational molding process, via an injection molding process, via a casting process, etc.). Accordingly, the plenum body 48, the flange 50, the outlet ports 54, the pressurization port 78, the ribs 86, 88, 90, 134, 136, 138, and the baffles 108 and 110 may be formed from a single piece of material (e.g., polymeric material, metal material). As a result, the manufacturing cost of the plenum 36 may be significantly reduced, as compared to plenums formed by coupling multiple separately formed components to one another. In certain embodiments, the baffles 108, 110 are formed around an element of a mold/tool during a rotational molding process. In such embodiments, the element is removed from the baffles 108, 110 as the plenum 36 is released from the mold/tool. In certain embodiments, plates may be inserted into the rotationally molded baffles to increase the structural rigidity of the baffles. In alternative embodiments, the baffles 108, 110 are formed around respective plates (e.g., metal plates) during the rotational molding process. In such embodiments, the plates remain embedded in the baffles 108, 110, thereby enhancing the structural rigidity of the baffles 108, 110. In the illustrated embodiment, each baffle 108, 110 includes a rounded leading edge 160, a rounded trailing edge 162, and rounded side edges 164. The rounded edges may substantially reduce the pressure loss of the air flow through the plenum 36, thereby substantially maintaining the desired flow characteristics at the outlet ports 54 and at the pressurization port 78. In the illustrated embodiment, the baffles 108, 110 extend substantially perpendicularly to the top and bottom element 66, 68. However, it should be appreciated that in certain embodiments, the baffles may be angled relative to the top element 66 and/or the bottom element 68.

Figure 9:
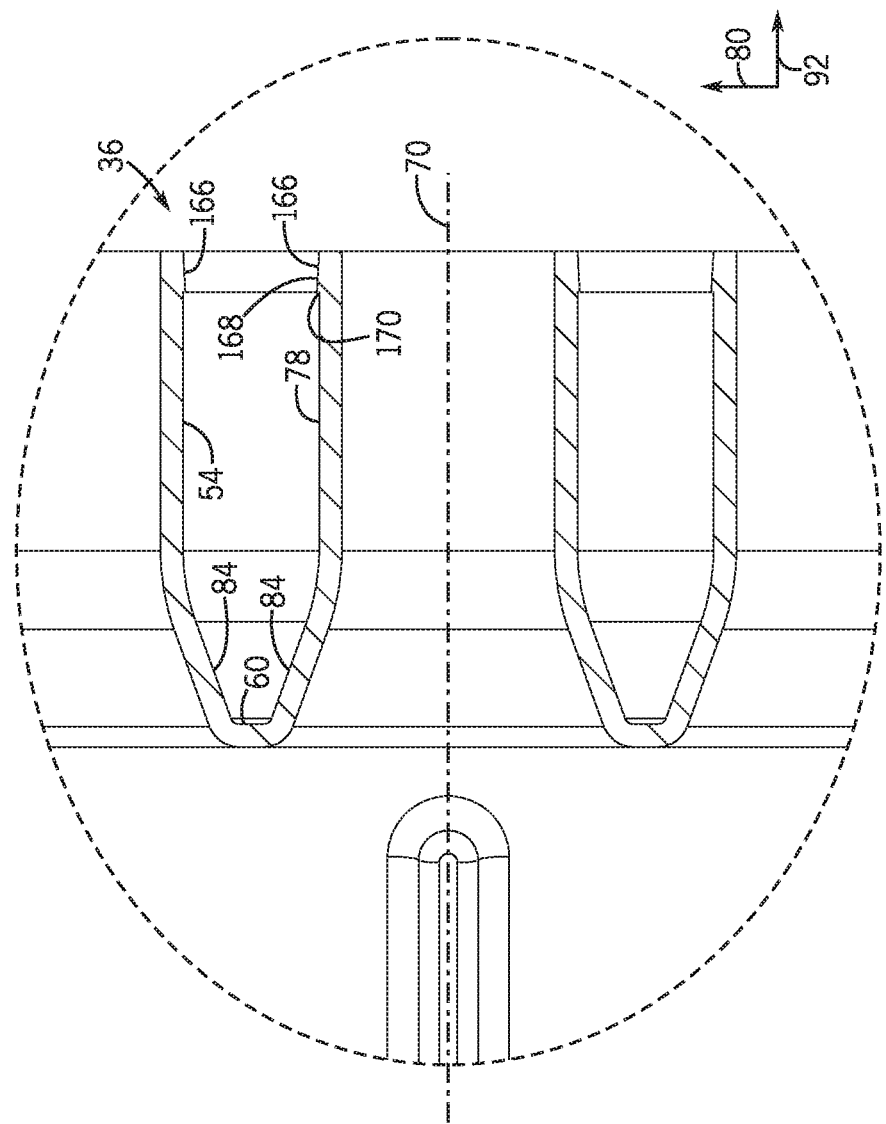
FIG. 9 is a detailed cross-sectional view of the plenum of FIG. 4, taken within line 9-9 of FIG. 7.

FIG. 9 is a detailed cross-sectional view of the plenum 36 of FIG. 4, taken within line 9-9 of FIG. 7. As illustrated, a transition 84 extends between the face element 60 and the pressurization outlet 78. The transition is configured to reduce the pressure drop of the air flow from the plenum body 48 to the pressurization outlet 78, thereby maintaining the desired flow characteristics at the pressurization port. The configuration (e.g., radius of curvature, length, profile, initial diameter, etc.) of the transition may be particularly configured for the expected flow through the plenum 36. For example, the transition 84 may be rounded, tapered, or chamfered, among other shapes/profiles. In the illustrated embodiment, the transitions 84 extend between the face element 60 and respective outlet ports 54. In certain embodiments, the transitions at the outlet ports 54 may be substantially the same as the transition at the pressurization port 78. However, in alternative embodiments, each outlet port transition may have a different configuration (e.g., radius of curvature, length, profile, initial diameter, etc.) than the pressurization port transition. Furthermore, in certain embodiments, certain outlet port transitions may differ from one another based on the expected flow into the respective outlet ports 54. In certain embodiments, certain outlet port transitions and/or the pressurization port transition may be omitted (e.g., a constant diameter port may extend from the face element).

In the illustrated embodiment, the outlet ports 54 and the pressurization port 78 each include a barb 166 at the distal end of the respective port. Each barb 166 is configured to facilitate retention of a hose on the respective port. As illustrated, each barb 166 includes an angled portion 168 configured to enable a hose to engage the outlet port 54 or the pressurization port 78. Once the hose is engaged with the respective port, a hose clamp may be positioned around the hose between a proximal end of the port and the barb 166 (e.g., between the barb 166 and the transition 84). The hose clamp may then be tightened to compress the hose such that the inner diameter of the hose is less than the maximum diameter of the barb. As a result, movement of the hose away from the port may be blocked by contact between the hose and a retaining surface 170 of the barb 166. Accordingly, the hose may remain coupled to the port during operation of the air cart and implement. In certain embodiments, the height of the retaining surface 170 (i.e., the radial extent of the retaining surface beyond the outer surface of the port) may be particularly selected such that the hose clamp may be tightened to a degree that enables the hose to rotate about the port while blocking movement of the end of the hose relative to the port (e.g., blocking longitudinal movement of the hose end away from the port, blocking lateral and/or vertical movement of the hose end relative to the port, etc.). While each port in the illustrated embodiment includes one barb, it should be appreciated that certain ports may include more or fewer barbs. For example, in certain embodiments, certain ports may include 0, 1, 2, 3, 4, or more barbs. Moreover, while each illustrated barb includes an angled portion and a retaining surface, it should be appreciated that other barb shapes (e.g., arcuate, polygonal, etc.) may be utilized in alternative embodiments.

Figure 10:
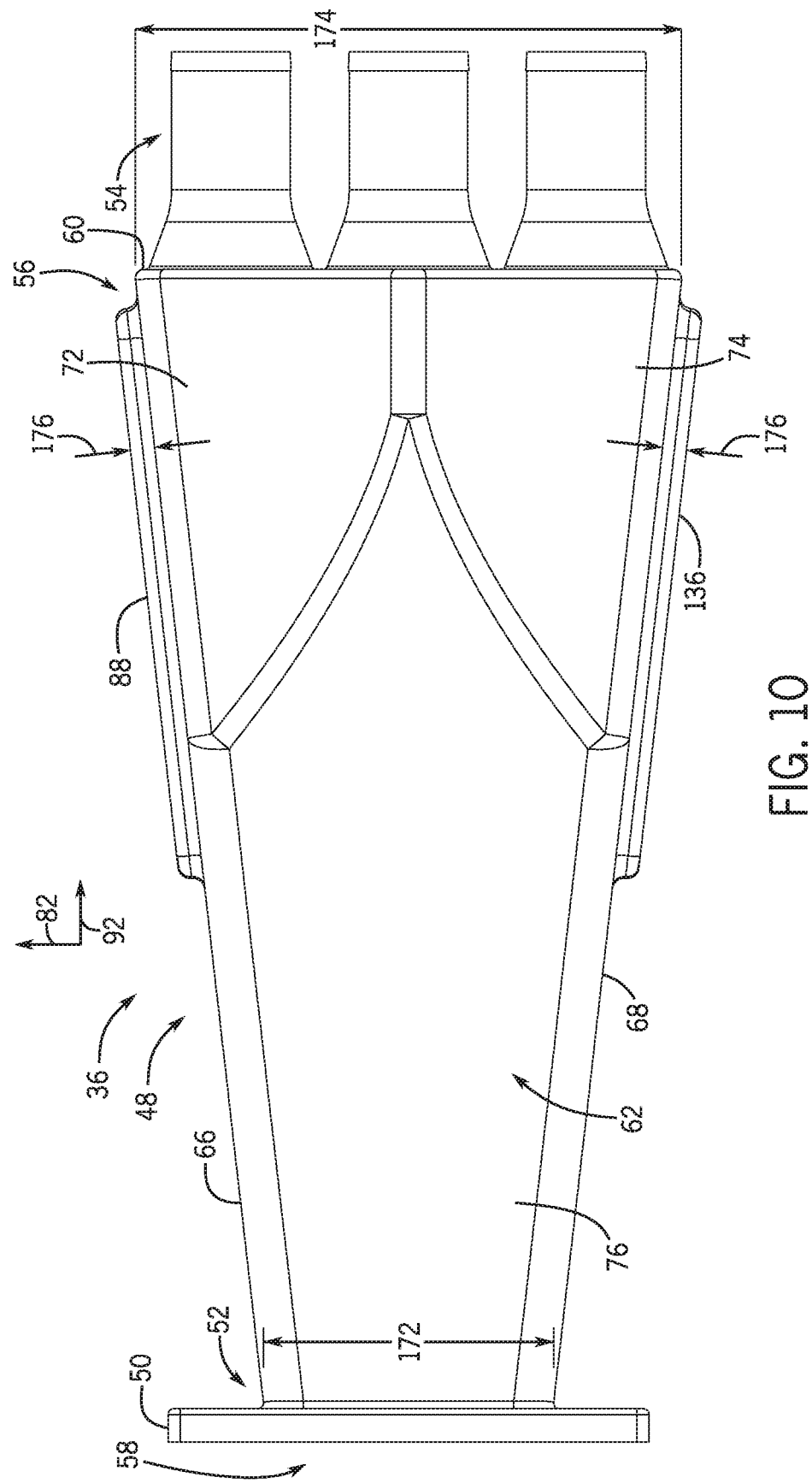
FIG. 10 is a side view of the plenum of FIG. 4.

FIG. 10 is a side view of the plenum of FIG. 4. As illustrated, the body 48 of the plenum 36 expands vertically from the first end 52 to the second end 56. The vertical expansion increases the cross-sectional area of the plenum body 48 from the inlet 58 to the outlet ports 54 and the pressurization port 78. As a result, the velocity of the air flow decreases and the static pressure of the air flow increases as the air flows from the inlet 58 to the ports 54, 78. As illustrated, a first height 172 of the plenum body 48 at the first end 52 (e.g., at the inlet 58) is less than a second height 174 of the plenum body 48 at the second end 56 (e.g., at the face element 60). For example, in certain embodiments, the second height 174 may be about 10 percent, about 20 percent, about 25 percent, about 30 percent, about 40 percent, about 50 percent, or more, larger that the first height 172. By way of further example, the second height 174 may be about 5 to 75 percent, about 10 to 60 percent, about 15 to 50 percent, or about 25 to 40 percent larger than the first height 172. In alternative embodiments, the first height 172 may be substantially equal to the second height 174.

As previously discussed, each rib is particularly shaped to reduce the effect of the rib on the flow characteristics at the outlet ports 54 and at the pressurization port 78. Accordingly, a height 176 of each rib may be particularly selected to reduce the pressure drop of the air flow proximate to the rib, thereby substantially maintaining the flow characteristics at the outlet ports 54 and at the pressurization port 78. For example, in certain embodiments, the height 176 of each rib may be about 1 percent, about 2 percent, about 3 percent, about 5 percent, about 6 percent, about 7 percent or more of the second height 174. By way of example, the height 176 of each rib may be about 1 to 10 percent, about 2 to 8 percent, about 3 to 7 percent, or about 6 to 7 percent of the second height 174. In the illustrated embodiment, the height of each rib is substantially equal. However, it should be appreciated that one or more ribs may have different heights in alternative embodiments. In addition, while the height of each rib is substantially uniform between the rounded leading edge and the rounded trailing edge in the illustrated embodiment, it should be appreciated that in alternative embodiments, the height of certain rib(s) may vary along the length of the rib (e.g., the height of certain rib(s) may increase along the length from the leading edge to the trailing edge, the height of certain rib(s) may decrease along the length from the leading edge to the trailing edge, etc.). Furthermore, one or more features described above with reference to FIGS. 4-10 (e.g., the ribs, the one-piece plenum configuration, the vertical expansion of the plenum body along the longitudinal axis, the rounded transitions to the outlet ports and pressurization port, and the barbs on the outlet ports and the pressurization port) may be omitted from the plenum in certain embodiments.

Figure 11:
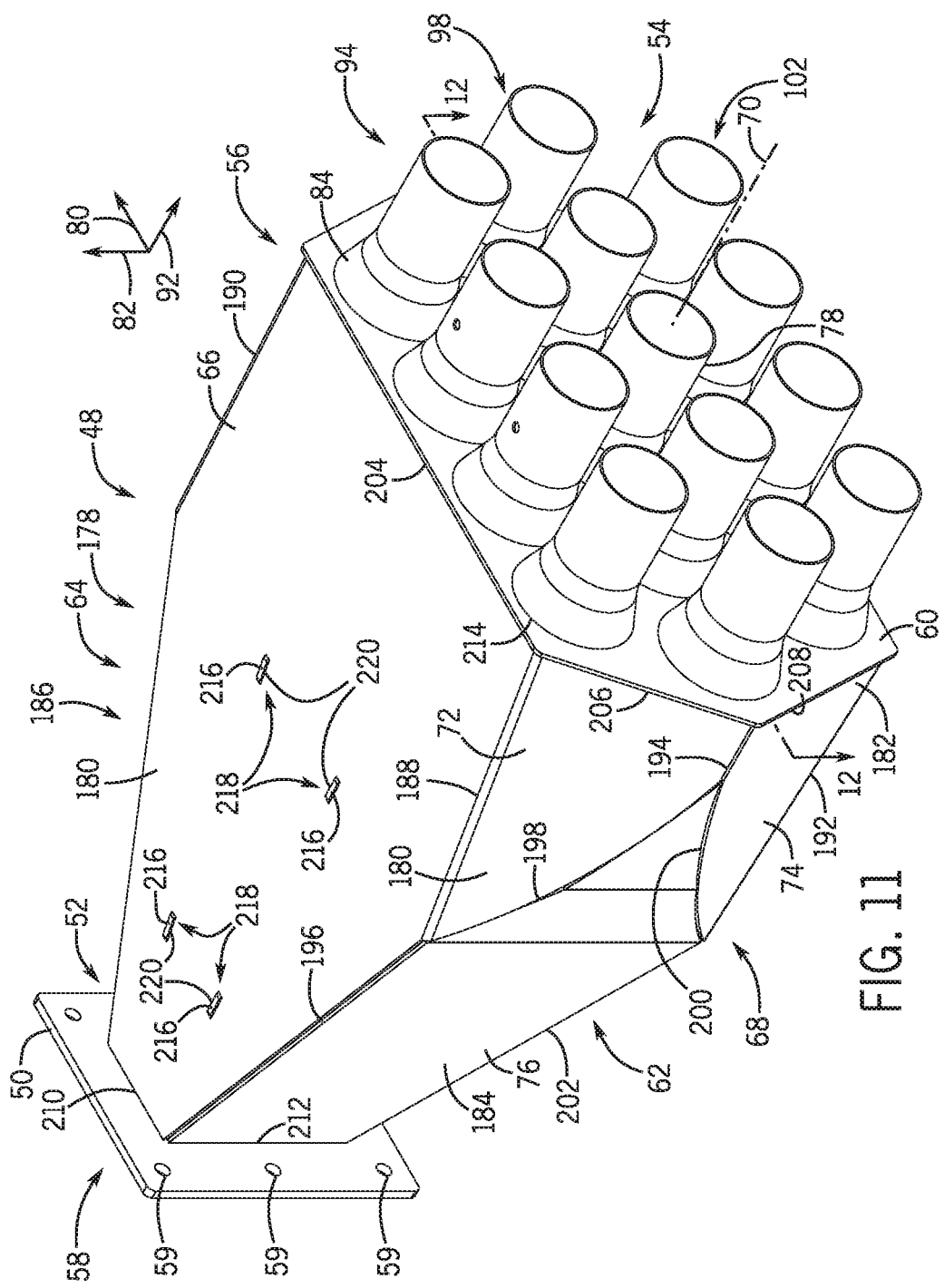
FIG. 11 is a perspective view of another embodiment of a plenum that may be employed within the air distribution system of FIG. 3.

FIG. 11 is a perspective view of another embodiment of a plenum 178 that may be employed within the air distribution system of FIG. 3. Similar to the embodiment described above with reference to FIGS. 4-10, the plenum 178 includes a body 48 having an inlet 58 positioned at a first end 52 of the body 48 and configured to receive a flow of air from an air source. The plenum body 48 also includes a first side 62 coupled to a top element 66 and to a bottom element 68, in which the top element 66 is opposite the bottom element 68. In addition, the plenum body 48 includes a second side 64, opposite the first side 62, coupled to the top element 66 and the bottom element 68. Furthermore, the plenum body 48 includes a face element 60 disposed on a second end 56 of the body 48, opposite the first end 52. The plenum 178 also includes outlet ports 54 and a pressurization port 78 extending from the face element 60 and configured to direct the flow of air out of the plenum 178. In the illustrated embodiment, the ports (e.g., the outlet ports 54 and the pressurization port 78) are arranged on the face element 60 in a first row 94, a second row 98, and a third row 102. The first row 94 is positioned proximate to the top element 66, the third row 102 is positioned proximate to the bottom element 68, and the second row 98 is positioned between the first row 94 and the third row 102. Similar to the embodiment described above with reference to FIGS. 4-10, a length of the second row is greater than a length of the first row and a length of the third row, and a shape of the face element 60 (e.g., a substantially hexagonal shape) is configured to accommodate the length of each row.

In the illustrated embodiment, each of the first side 62 and the second side 64 include a first section 72, a second section 74, and a third section 76. The first section 72 and the second section 74 are substantially flat. In addition, only the first and second sections 72, 74 are connected to the face element 60, and only the third section 76 is connected to the flange 50 at the inlet 58. The configuration of the sections enables the plenum body 48 to expand from the inlet 58 to the outlet ports 54 and the pressurization port 78 while enabling the sides 62, 64 to match the contours of the face element 60.

In the illustrated embodiment, the plenum body 48 is formed from a first sheet of material 180, a second sheet of material 182, a third sheet of material 184, and fourth sheet of material 186. The first sheet of material 180 forms the top element 66, the first section 72 of the first side 62, and the first section 72 of the second side 64. The second sheet of material 182 forms the bottom element 68, the second section 74 of the first side 62, and the second section 74 of the second side 64. In addition, the third sheet of material 184 forms the third section 76 of the first side 62, and the fourth sheet of material 186 forms the third section 76 of the second side 64. In certain embodiments, each sheet of material may be formed from sheet steel, sheet aluminum, or any other suitable material.

To form the plenum body 48 from the four sheets of material, the first sheet of material 180 is bent along a first bend 188 and a second bend 190 to form the top element 66, the first section 72 of the first side 62, and the first section 72 of the second side 64. The first bend 188 separates the top element 66 from the first section 72 of the first side 62, and the second bend 190 separates the top element 66 form the first section 72 of the second side 64. Next, the second sheet of material 182 is bent along a first bend 192 and a second bend to form the bottom element 68, the second section 74 of the first side 62, and the second section 74 of the second side 64. The first bend 192 separates the bottom element 68 from the second section 74 of the first side 62, and the second bend separates the bottom element 68 from the second section 74 of the second side 64.

The first, second, and third sections of each side are then coupled to one another (e.g., via welding). For example, in certain embodiments, the first and second sections of each side may be welded to one another along a first joint 194, the top element 66 is welded to the third section 76 of each side along a second joint 196, the first section 72 of each side is welded to the respective third section 76 along a third joint 198, the second section 74 of each side is welded to the respective third section 76 along a fourth joint 200, and the bottom element 68 is welded to the third section 76 of each side along a fifth joint 202. In addition, the top element 66 is welded to the face element 60 along a sixth joint 204, the first section 72 of each side is welded to the face element 60 along a seventh joint 206, the second section 74 of each side is welded to the face element 60 along an eighth joint 208, and the bottom element 68 is welded to the face element 60 along a ninth joint. Furthermore, the top element 66 is welded to the flange 50 along a tenth joint 210, the third section 76 of each side is welded to the flange 50 by an eleventh joint 212, and the bottom element is welded to the flange 50 by a twelfth joint. Each port (e.g., the outlet ports 54 and the pressurization port 78) is welded to the face element 60 by a thirteenth joint 214.

In the illustrated embodiment, the plenum includes a baffle assembly having baffles secured to the plenum body (e.g., by welded connections). As illustrated, each baffle includes two tabs 216 that each extend through a respective opening 218 in the top element 60. Each baffle may also include two additional tabs that each extend through a respective opening in the bottom element 68. The tabs and openings facilitate alignment of the baffles within the plenum body. The tabs 216 are coupled to the top element 60 at the respective openings 218 by connections 220 (e.g., welded connections), thereby securing the baffles to the plenum body. While each baffle includes two tabs extending through respective openings in the top element, and in certain embodiments, two tabs extending through respective openings in the bottom element, it should be appreciated that in alternative embodiments, each baffle may include more or fewer tabs (e.g., 1, 2, 3, 4, 5, 6, or more) extending through respective openings in a respective element. Moreover, it should be appreciated that the baffles may be coupled to the plenum body without tabs in alternative embodiments.

While the elements are welded to one another at the joints and at the welded connections in the illustrated embodiment, it should be appreciated that in alternative embodiments, at least a portion of the elements may be connected to one another at the respective joints/connections by another coupling system, such as fasteners, adhesive bonding, rivets, or tongue and groove connections, among others. Forming the plenum body by bending sheets of material and then coupling the sheets of material to one another in the manner described above facilitates formation of a plenum body configured to provide a flow of air to a large number of ports (e.g., 13 ports) with desired flow characteristics while reducing the number of parts in the plenum body. Accordingly, the cost of producing a plenum having a large number of ports (e.g., 13 or more ports) may be reduced, as compared to plenums having a body formed by coupling many smaller sheets of material (e.g., more than 4) to one another.

Figure 12:
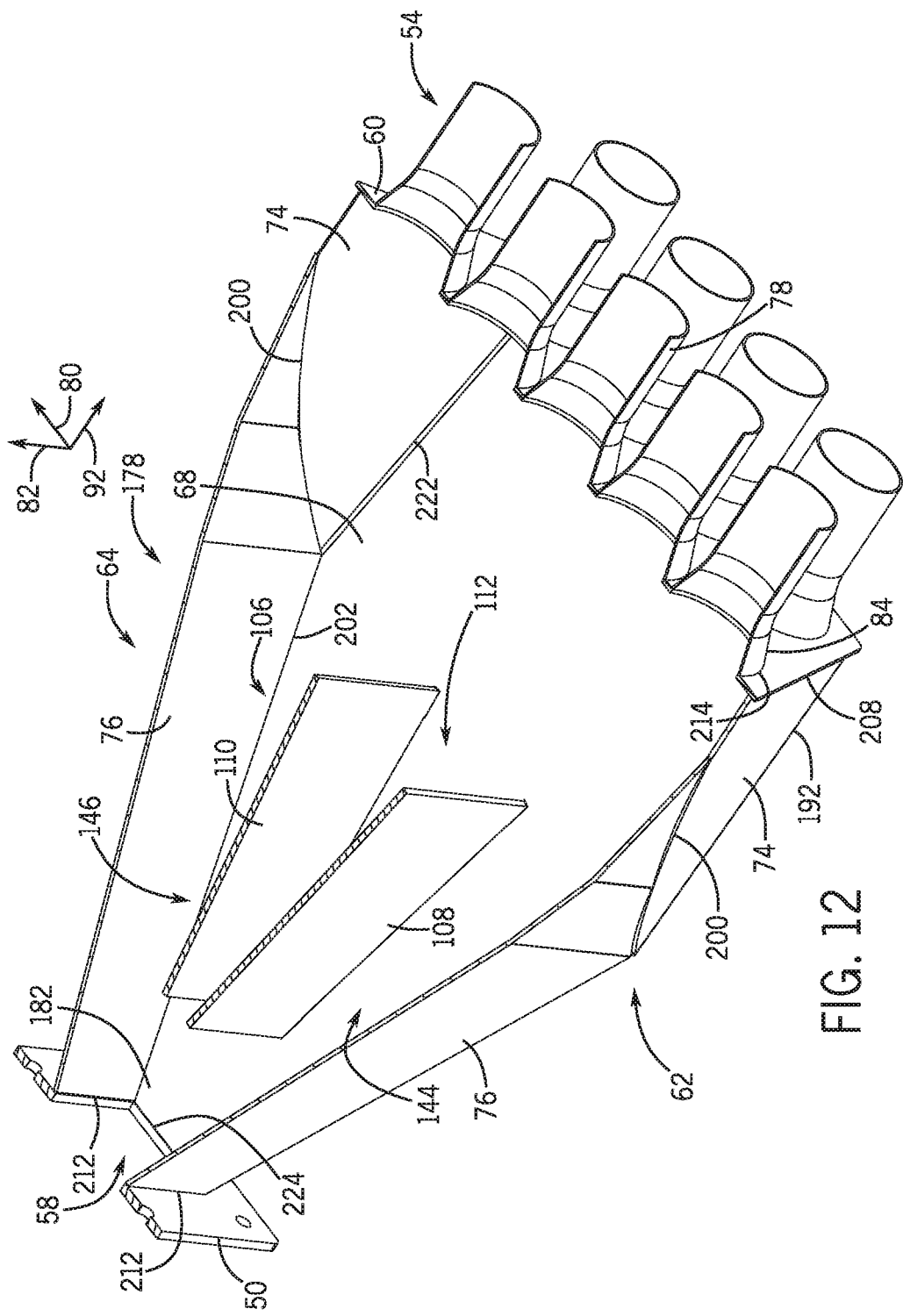
FIG. 12 is a cross-sectional perspective view of the plenum of FIG. 11, taken along line 12-12 of FIG. 11.

FIG. 12 is a cross-sectional perspective view of the plenum of FIG. 11, taken along line 12-12 of FIG. 11. Similar to the embodiment described above with reference to FIGS. 4-10, the plenum 178 includes a baffle assembly 106 having first baffle 108 and a second baffle 110. As previously discussed, each baffle is coupled to at least the top element by tabs extending through respective openings and welded to the top element. As illustrated, the baffle assembly forms three flow passages. The first passage 112 is disposed between the first and second baffles 108, 110. A second passage 144 is formed between the first side 62 of the plenum body 48 and the first baffle 108, and a third passage 146 is formed between the second side 64 of the plenum body 48 and the second baffle 110. In certain embodiments, the first, second, and third passages 112, 144, 146 have varying flow characteristics based on the air flow from the air source. For example, the air source may introduce a high pressure air flow into the plenum 36 at the inlet 58 that is directed toward the first passage 112. However, the first and second baffles 108, 110 are configured to divert a portion of the air flow toward the second and third passages 144, 146. Additionally, the configuration of the baffle assembly 106 may modify the flow characteristics in each of the passages 112, 144, 146. For example, as the cross-sectional area of each flow passage increases, the velocity of the flow traveling through the passage decreases. Moreover, the baffle assembly 106 may be configured to dissipate flow vortices at the inlet 58 introduced by the air flow from the air source. Accordingly, the baffle assembly 106 may be configured to obtain desired flow characteristics within the plenum 178.

As previously discussed, the second sheet of material 182 is bent along a first bend 192 and a second bend 222 to form the bottom element 68, the second section 74 of the first side 62, and the second section 74 of the second side 64. The first bend 192 separates the bottom element 68 from the second section 74 of the first side 62, and the second bend 222 separates the bottom element 68 from the second section 74 of the second side 64. In addition, the second section 74 of each side is welded to the respective third section 76 along the fourth joint 200, and the bottom element 68 is welded to the third section 76 of each side along the fifth joint 202. Furthermore, the second section 74 of each side is welded to the face element 60 along the eighth joint 208, and the bottom element 68 is welded to the face element 60 along a ninth joint. The third section 76 of each side is also welded to the flange 50 by the eleventh joint 212, and the bottom element 68 is welded to the flange 50 by the twelfth joint 224. As previously discussed, forming the plenum body by bending sheets of material and then coupling the sheets of material to one another in the manner described above facilitates formation of a plenum body configured to provide a flow of air to a large number of ports (e.g., 13 ports) with desired flow characteristics while reducing the number of parts in the plenum body.

Figure 13:
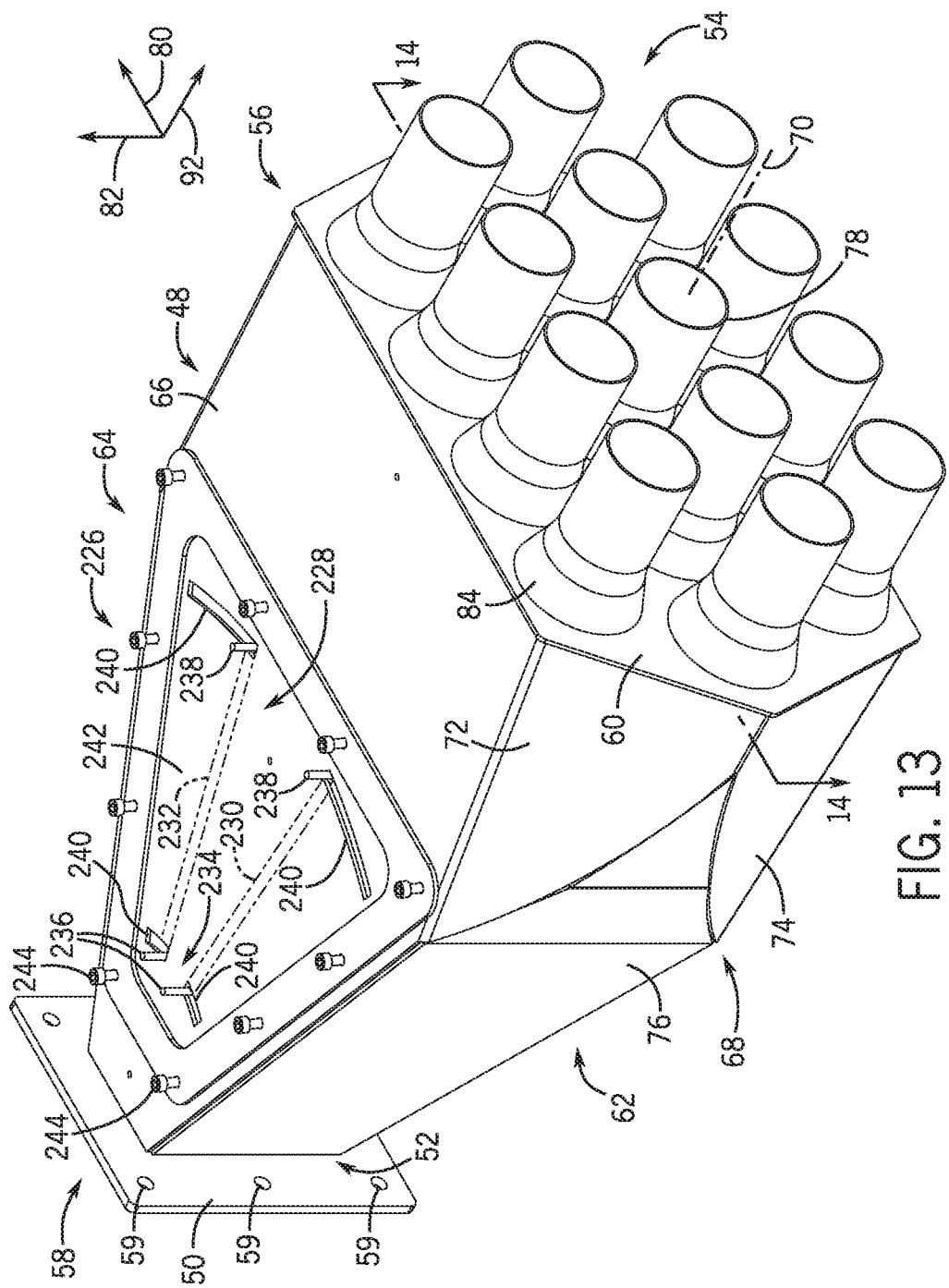
FIG. 13 is a perspective view of a further embodiment a plenum that may be employed within the air distribution system of FIG. 3.

FIG. 13 is a perspective view of a further embodiment a plenum 226 that may be employed within the air distribution system of FIG. 3. In the illustrated embodiment, the plenum 226 includes a body 48 having an inlet 58 positioned at a first end 52 of the body 48 and configured to receive a flow of air from an air source. The plenum body 48 also includes a face element 60 positioned on a second end 56 of the body 48, opposite the first end 52. Similar to the embodiments described above with reference to FIGS. 4-12, the face element 60 has a substantially hexagonal shape. In addition, the plenum 226 includes multiple outlet ports 54 and a pressurization port 78 extending from the face element 60 and configured to direct the flow of air out of the plenum 226. The plenum 226 also includes a baffle assembly 228 disposed within the body 48 and configured to control the flow of air through the plenum 226. The baffle assembly 228 includes two baffles 230, 232 and an adjustment assembly 234. The adjustment assembly 234 is configured to control an angle of the baffles and/or a lateral position of the baffles.

In the illustrated embodiment, the adjustment assembly 234 includes top pins 236, 238 extending from each baffle. The top pins 236, 238 engage corresponding slots 240 in the top element 66. In addition, the adjustment assembly includes bottom pins extending from each baffle. The bottom pins engage corresponding slots in the bottom element 68. The adjustment assembly 234 is configured to control the angle of the baffles 230, 232 and the lateral position of the baffles 230, 232 via movement of the pins within the slots 240. In the illustrated embodiment, a first top pin 236 is positioned proximate to a leading edge of each baffle, and a second top pin 238 is positioned proximate to a trailing edge of each baffle. In addition, as discussed in detail below, a first bottom pin is positioned proximate to the leading edge of each baffle, and a second bottom pin is positioned proximate to the trailing edge of each baffle. The angle and the lateral position each baffle 230, 232 may be controlled via movement of the first and second top pins 236, 238 and the first and second bottom pins within respective slots 240.

In the illustrated embodiment, the plenum includes a panel 242 configured to selectively couple to the body 48 to form a portion of the top element 66. The panel 242 is configured to selectively block an opening in the body that facilitates insertion and removal of the baffles 230, 232. Accordingly, with the panel 242 removed, an operator may remove and replace the baffles (e.g., to install baffles having a different shape/configuration to establish the desired flow characteristics at the outlet ports and at the pressurization port). Once the baffles are disposed within the body 48, the operator may secure the panel 242 to the body 48 with fasteners 244, such as the illustrated bolts. While the panel 242 is secured to the body 48 with fasteners in the illustrated embodiment, it should be appreciated that in alternative embodiments, the panel may be secured to the body by other coupling systems (e.g., magnets, latches, etc.). While the panel 242 forms part of the top element 66 in the illustrated embodiment, it should be appreciated that in alternative embodiments, the panel may form part of the bottom element, part of a side of the plenum body, or part of multiple element(s)/side(s).

While baffle assembly 228 includes two baffles 230, 232 in the illustrated embodiment, it should be appreciated that in alternative embodiments, the baffle assembly 228 may include more or fewer baffles (e.g., 1, 2, 3, 4, 5, 6, or more). Furthermore, while each baffle includes two top pins 236, 238 and two bottom pins, it should be appreciated that in alternative embodiments, each baffle may include more or fewer top pins and/or more or fewer bottom pins. For example, in certain embodiments, at least one baffle may include a single top pin and/or a single bottom pin. In such embodiments, the at least one baffle may be rotatably coupled to the body (e.g., via a pivot coupled to the top element and/or the bottom element). The angle of the at least one baffle may be adjusted by moving the single top pin and/or the single bottom pin within the respective slot(s), but the lateral position of the baffle may be fixed. Furthermore, while the slots 240 are curved in the illustrated embodiment, it should be appreciated that in alternative embodiments, certain slots may extend linearly along the lateral axis 80 and/or the longitudinal axis 92. In such embodiments, the lateral position and/or the longitudinal position of the baffle having pins disposed through the linear slots may be adjusted by moving the pins within the slots, but the angle of the baffle may be fixed. In further embodiments, certain curved slots may extend along the longitudinal axis 92, thereby facilitating adjustment of the longitudinal position of a baffle having pins that extend through the slots.

In certain embodiments, the pins may include a locking feature configured to secure the pins within a selected position of the respective slots. For example, each pin may be threaded, and a nut may be engaged with the threaded pin. Tightening the nut against the top element or the bottom element may secure the pin in the selected position along the slot. In addition, while the illustrated adjustment assembly 228 includes pins and slots, it should be appreciated that in alternative embodiments, the adjustment assembly may include other devices/systems configured to facilitate adjustment of the angle and/or the lateral position of the baffles (e.g., locking pivots, tracks, etc.).

Figure 14:
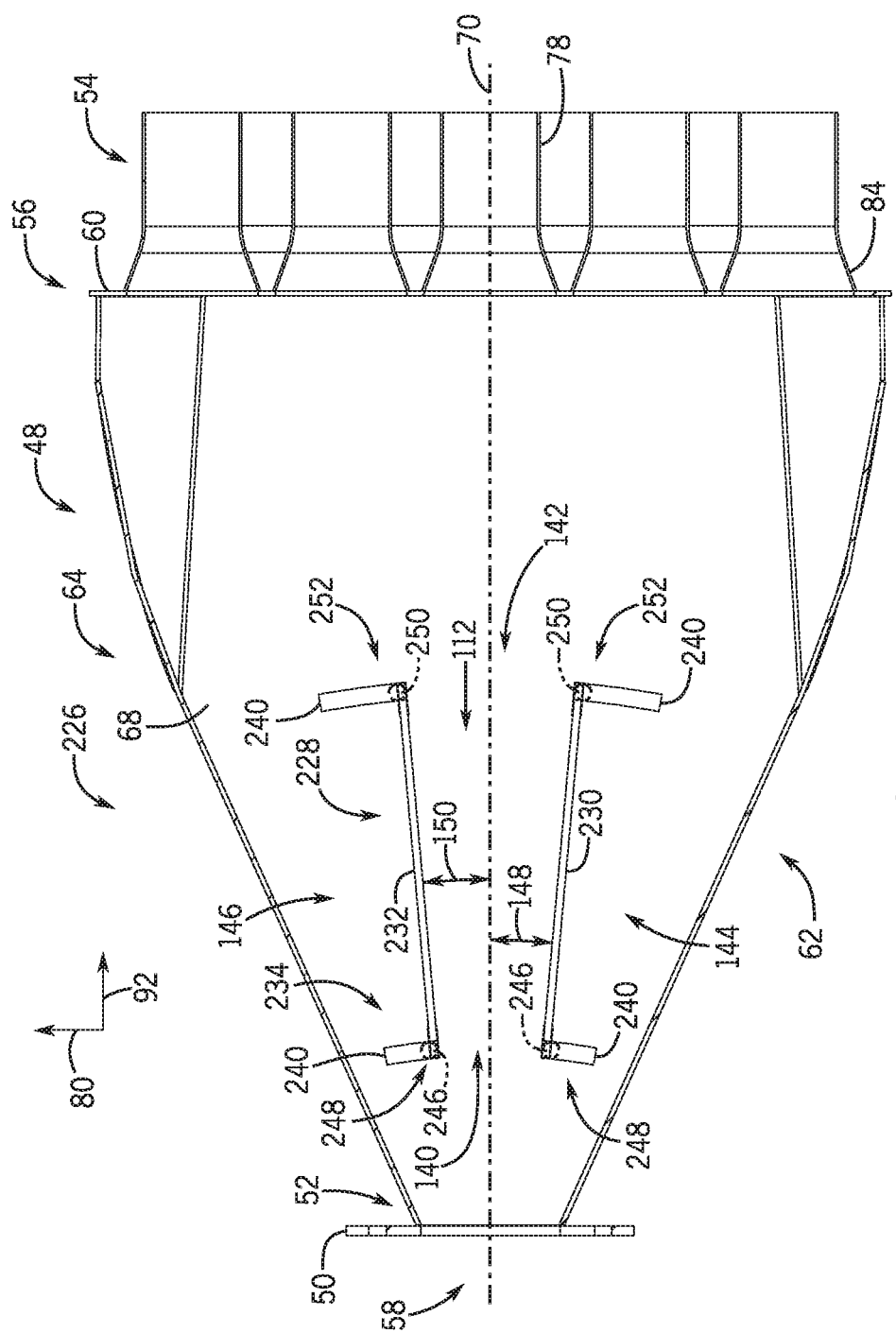
FIG. 14 is a cross-sectional view of the plenum of FIG. 13, taken along line 14-14 of FIG. 13.

FIG. 14 is a cross-sectional view of the plenum of FIG. 13, taken along line 14-14 of FIG. 13. In the illustrated embodiment, the baffle assembly 228 includes the first baffle 230 positioned on a first side of the longitudinal centerline 70 of the plenum 226 and the second baffle 232 positioned on a second side of the longitudinal centerline, opposite the first side. Similar to the embodiments described above with reference to FIGS. 4-12, the first baffle 230 and the second baffle 232 are configured to establish a first passage 112 (e.g., central passage) between the first and second baffles, a second passage 144 between the first baffle 230 and the first side 62 of the plenum body 48, and a third passage 146 between the second baffle 232 and the second side 64 of the plenum body 48. The baffles 230, 232 may be adjusted via the adjustment assembly to provide the desired flow characteristics within the plenum. For example, the baffles 230, 232 may be adjusted such that a first flow characteristic of the flow of air in the first passage 112 is different than a second flow characteristic of the flow of air in the second and third passages 144, 146.

In the illustrated embodiment, a first bottom pin 246 is positioned proximate to the leading edge 248 of each baffle, and a second bottom pin 250 is positioned proximate to the trailing edge 252 of each baffle. As illustrated, each pin 246, 250 is disposed within a respective slot 240 within the bottom element 68. In the illustrated embodiment, the angle and the lateral position of each baffle is adjustable by moving the pins within the slots. For example, the first angle 148 of the first baffle 230 may be adjusted by moving the first bottom pin 246 and the first top pin within the respective slots, and/or by moving the second bottom pin 250 and the second top pin within the respective slots. In addition, the second angle 150 of the second baffle 232 may be adjusted by moving the first bottom pin 246 and the first top pin within the respective slots, and/or by moving the second bottom pin 250 and the second top pin within the respective slots. Furthermore, a position of the first baffle 230 along the lateral axis 80 may be adjusted by moving the first bottom pin, the first top pin, the second bottom pin, and the second top pin within the respective slots. And, a position of the second baffle 230 along the lateral axis 80 may be adjusted by moving the first bottom pin, the first top pin, the second bottom pin, and the second top pin within the respective slots. Adjusting the angle and the lateral position of each baffle varies the configuration of the first passage 112, the second passage, 144, the third passage 146, or a combination thereof. Accordingly, the angle and the lateral position of each baffle may be adjusted to achieve the desired flow characteristics within the plenum 226.

While the first baffle 230 and the second baffle 232 are adjustable in the illustrated embodiment, it should be appreciated that in alternative embodiments, the only one of the baffles may be adjustable. In addition, while each baffle includes two top pins and two bottom pins, it should be appreciated that in alternative embodiments, one or more of the top pins and/or one or more of the bottom pins may be omitted. Furthermore, in certain embodiments, the adjustment assembly 234 may include additional adjustment devices to control the position and/or orientation of the baffles. For example, in certain embodiments, the adjustment assembly may include a track assembly configured to facilitate adjustment of a longitudinal position of at least one baffle (e.g., in addition to the pins and slots).

While the baffles are manually adjustable in the illustrated embodiment, it should be appreciated that in alternative embodiments, the adjustment assembly may include one or more actuators (e.g., pneumatic actuator(s), hydraulic actuator(s), electromechanical actuator(s), etc.) configured to adjust the position and/or orientation of at least one baffle. The actuator(s) may be communicatively coupled to a control system (e.g., including an electronic controller, a valve assembly, etc.). In certain embodiments, the control system may be communicatively coupled to a user interface that enables an operator to input the desired position and/or orientation of the baffle(s), and/or presents a visual indication of the position and/or orientation of the baffle(s) to the operator. Additionally or alternatively, the control system may be configured to automatically instruct the actuator(s) to adjust the position and/or orientation of the baffle(s) (e.g., based on determined flow characteristics within the plenum, operating conditions of the air cart, product type, implement configuration, etc.).

Figure 15:
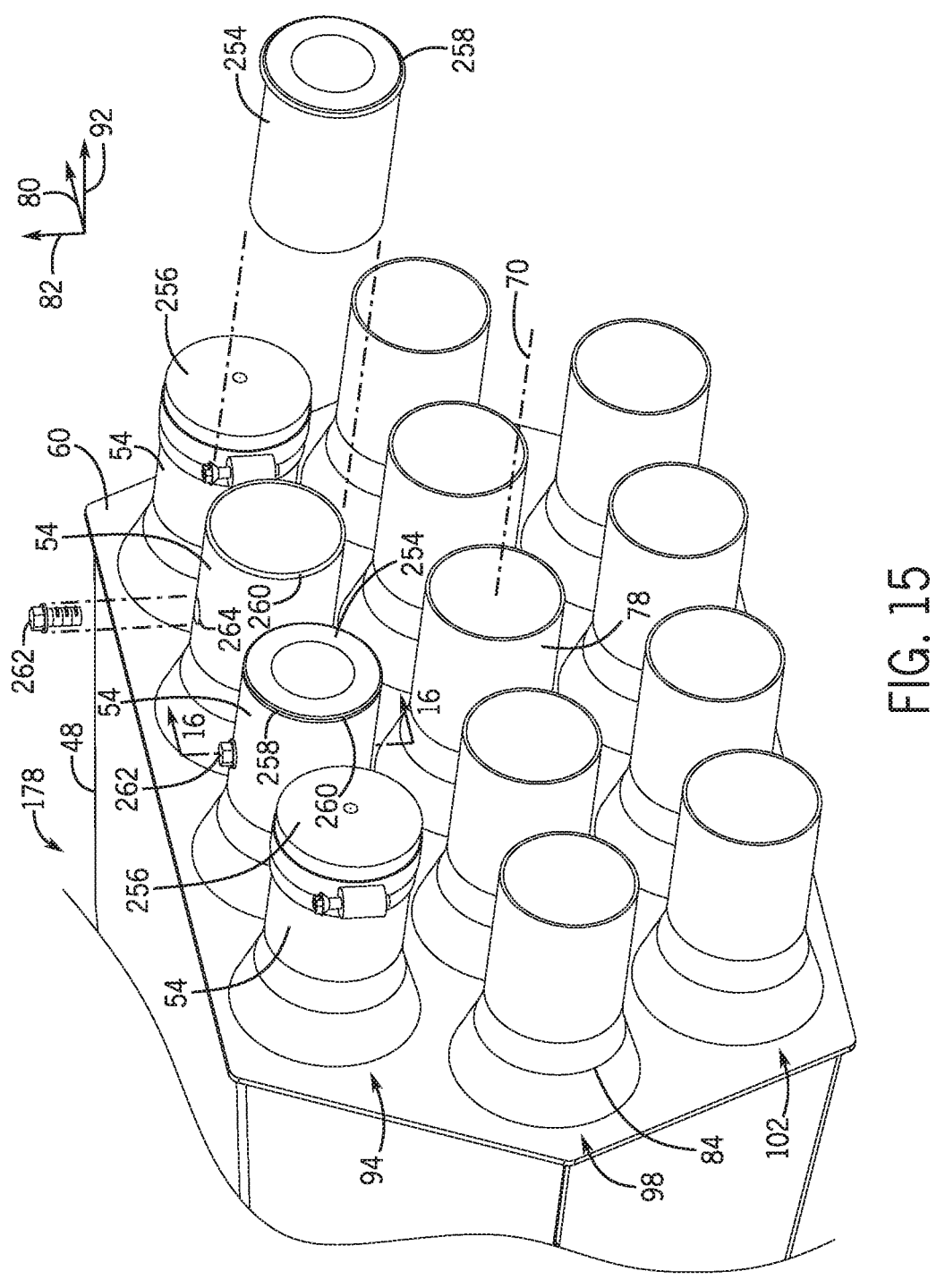

FIG. 15 is a perspective view of a portion of the plenum 178 of FIG. 11, including flow restrictors 254. Each flow restrictor 254 is configured to be disposed within a respective port (e.g., outlet port 54 or pressurization port 78) to restrict flow through the port (e.g., to reduce the flow rate of air through the port, to increase the pressure loss at the port, etc.). As illustrated, two outlet ports 54 of the first row 94 are blocked by plugs 256 (e.g., because the plenum include more outlet ports than hoses on the air cart). Blocking the flow of air through the two outlet ports 54 may increase the flow of air through the other outlet ports 54 and/or through the pressurization port 78. Accordingly, restricting the flow of air through certain ports (e.g., two outlet ports 54 of the first row 94) may establish the desired flow characteristics at each of the ports. While the illustrated plenum 178 includes two flow restrictors, it should be appreciated that more or fewer flow restrictors (e.g., 0, 1, 2, 3, 4, 5, 6, 7, 8, or more) may disposed within respective ports. In addition, a minimum cross-sectional area (e.g., at a minimum diameter) of the air flow path through each flow restrictor may be the same or different to establish the desired flow characteristics through the plenum.

In the illustrated embodiment, each flow restrictor 254 includes a lip 258 configured to engage a distal end 260 of the respective port (e.g., outlet port 54, pressurization port 78, etc.) to block movement of the flow restrictor 254 into the body 48 (e.g., along the longitudinal axis 92) while the flow restrictor 254 is disposed within the respective port. Furthermore, a fastener 262 is configured to extend through an opening 264 in the respective port and into the flow restrictor 254 to couple the flow restrictor 254 to the respective port. For example, to install a flow restrictor into a port, the flow restrictor may be aligned with the port and then translated toward the port along the longitudinal axis until the lip engages the distal end of the port. The fastener may then be disposed through the opening in the port and into the flow restrictor, thereby securing the flow restrictor to the port. A hose may then be coupled to the port. For example, the hose may engage the port and move along the port until a distal end of the hose contacts the fastener. As discussed in detail below, each flow restrictor 254 includes an internal passage having a minimum cross-sectional area less than a minimum internal cross-sectional area of the respective port. Accordingly, the flow restrictor restricts flow through the respective port.

Figure 16:
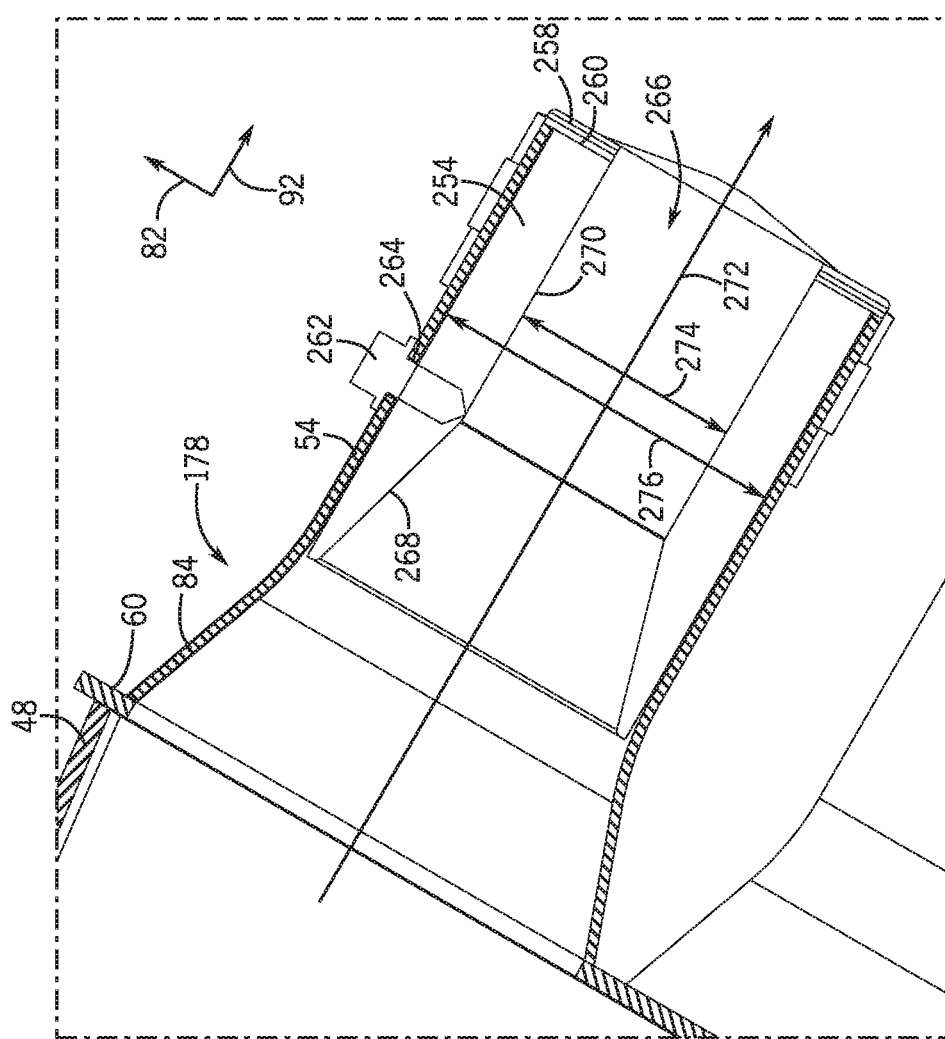
FIG. 16 is a detailed cross-sectional view of the plenum of FIG. 15, taken along line 16-16.

FIG. 16 is a detailed cross-sectional view of the plenum 178 of FIG. 15, taken along line 16-16. As illustrated, the lip 258 of the flow restrictor 254 engages the distal end 260 of the outlet port 54, and the fastener 262 extends through the opening 264 and into the flow restrictor 254, thereby securing the flow restrictor 254 to the outlet port 54. In the illustrated embodiment, the internal passage 266 of the flow restrictor 254 includes a converging section 268 (e.g., linear converging, non-linear converging, etc.) and a straight section 270 along a path 272 of the flow of air through the flow restrictor 254. As illustrated, the diameter of the converging section 268 decreases along the path 272, thereby decreasing the cross-sectional area of the internal passage 266 along the path 272. In addition, a diameter of the straight section 270 is substantially constant. Accordingly, the minimum diameter 274 of the internal passage 266 (e.g., at the straight section 270) is less than the minimum internal diameter 276 of the outlet port 54. Accordingly, the minimum cross-sectional area of the internal passage 266 is less than the minimum internal cross-sectional area of the outlet port 54. While the illustrated flow restrictor does not include a diverging section, it should be appreciated that in alternative embodiments, a diverging section (e.g., downstream from the straight section along the path of the flow of air) may be included. Furthermore, while the illustrated flow restrictor includes a converging section and a straight section, it should be appreciated that in alternative embodiments, the converging section or the straight section may be omitted. In such embodiments, the remaining section may be combined with a diverging section.

While the air path through the ports and the air path through the flow restrictors have circular cross sections in the illustrated embodiment, it should be appreciated that in alternative embodiments, the air path through certain port(s) and/or the air path through certain flow restrictor(s) may have other cross-sectional shapes (e.g., square, octagonal, elliptical, etc.). In such embodiments, the air path through the flow restrictor(s) may have a smaller cross-sectional area than the internal cross-sectional area of the respective port(s). Furthermore, while the flow restrictor is coupled to the respective port by the fastener, it should be appreciated that in alternative embodiments, the flow restrictor may be coupled to the respective port by another coupling assembly (e.g., a latch, a magnet, a clamp, etc.). In addition, while the flow restrictor includes a lip in the illustrated embodiment, it should be appreciated that in alternative embodiments, the lip may be omitted and/or the flow restrictor may include another feature configured to block movement into the plenum body while the flow restrictor is disposed within the respective port.

Furthermore, while only two outlet ports include openings 264 to receive the fasteners 262, it should be appreciated that in certain embodiments, each outlet port and/or the pressurization port may include an opening to receive a respective fastener. In further embodiments, the fasteners may include self-tapping screws, and the openings may be omitted. While the illustrated embodiment includes removable flow restrictors, it should be appreciated that in certain embodiments, the flow restrictors may be integrally formed with the outlet port. While the flow restrictors are disposed within ports of the plenum 178, it should appreciated that the flow restrictor may disposed within ports of the plenum 36, the plenum 226, or any other plenum having suitable ports. In addition, while the flow restrictor extends along a substantial portion of the longitudinal extent of the port in the illustrated embodiment, it should be appreciated that in alternative embodiments, the flow restrictor may have a larger or smaller longitudinal extent. For example, in certain embodiments, the flow restrictor may be formed from a substantially flat sheet of material having an opening that forms the internal passage.

While the plenums 36, 178, and 226 are described with reference to a seeder, it should be appreciated that the plenums may be used on other agricultural equipment to facilitate distribution of an air flow. For example, one or more of the plenums described above with reference to FIGS. 4-10, FIGS. 11-12, and FIG. 13-14 may be employed to distribute an air flow on fertilizer application equipment, planters, and cotton pickers, among other agricultural equipment. In such applications, the pressurization port of the plenum may be omitted.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A plenum configured to distribute a flow of air from an air source, comprising:
   a body having an inlet configured to receive the flow of air from the air source and a face element, wherein a shape of the face element is substantially hexagonal, and a baffle assembly disposed within the body and configured to control the flow of air through the plenum;
   a plurality of outlet ports extending from the face element, wherein each outlet port of the plurality of outlet ports is configured to direct the flow of air to an agricultural implement; and
   a pressurization port extending from the face element and configured to direct the flow of air substantially to a tank only.

2. The plenum of claim 1, wherein the plurality of outlet ports and the pressurization port are arranged on the face element in a first row of ports and a second row of ports, and the ports of the first row are laterally offset from the ports of the second row.

3. The plenum of claim 1, wherein the plurality of outlet ports and the pressurization port are arranged on the face element in three rows.

4. The plenum of claim 3, wherein a middle row of the three rows is longer than each of the other two rows of the three rows.

5. The plenum of claim 1, wherein the pressurization port is laterally centered on the face element.

6. The plenum of claim 1, wherein the inlet is positioned at a first end of the body, and the face element is positioned on a second end of the body, opposite the first end.

7. The plenum of claim 1, wherein the baffle assembly disposed within the body includes at least one baffle and an adjustment assembly.

8. The plenum of claim 1, comprising a flow restrictor configured to be disposed within one port of the pressurization port and the plurality of outlet ports, wherein the flow restrictor includes an internal passage having a minimum cross-sectional area less than a minimum internal cross-sectional area of the one port.

9. An agricultural product distribution system, comprising:
   an air source configured to supply a flow of air;
   a tank configured to store an agricultural product for distribution by an agricultural implement;
   a metering system configured to control a flow of the agricultural product from the tank to the agricultural implement via a plurality of distribution hoses; and
   a plenum fluidly coupled to the air source, wherein the plenum comprises:
      a body having an inlet configured to receive the flow of air from the air source and a face element, wherein a shape of the face element is substantially hexagonal, and a baffle assembly disposed within the body and configured to control the flow of air through the plenum;
      a plurality of outlet ports extending from the face element, wherein each outlet port of the plurality of outlet ports is configured to direct the flow of air to the agricultural implement via a respective distribution hose of the plurality of distribution hoses; and
      a pressurization port extending from the face element and configured to direct the flow of air substantially to the tank only via a pressurization hose.

10. The agricultural product distribution system of claim 9, wherein the plurality of outlet ports and the pressurization port are arranged on the face element in a first row of ports and a second row of ports, and the ports of the first row are laterally offset from the ports of the second row.

11. The agricultural product distribution system of claim 9, wherein the plurality of outlet ports and the pressurization port are arranged on the face element in three rows.

12. The agricultural product distribution system of claim 11, wherein a middle row of the three rows is longer than each of the other two rows of the three rows.

13. The agricultural product distribution system of claim 9, wherein the pressurization port is laterally centered on the face element.

14. The agricultural product distribution system of claim 9, wherein the inlet is positioned at a first end of the body, and the face element is positioned on a second end of the body, opposite the first end.

* * * * *